(12) United States Patent
Maddali et al.

(10) Patent No.: US 10,673,936 B2
(45) Date of Patent: Jun. 2, 2020

(54) SELF-ORGANIZED RETAIL SOURCE REQUEST ROUTING AND DISTRIBUTED LOAD SHARING SYSTEMS AND METHODS

(71) Applicant: Walmart Apollo, LLC, Bentonville, AR (US)

(72) Inventors: Praveen Kumar Maddali, Bengaluru (IN); Parijat Bansal, Bengaluru (IN); Prithvi Ranganath, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 201 days.

(21) Appl. No.: 15/858,388

(22) Filed: Dec. 29, 2017

(65) Prior Publication Data

US 2018/0191818 A1   Jul. 5, 2018

Related U.S. Application Data

(60) Provisional application No. 62/464,784, filed on Feb. 28, 2017.

(30) Foreign Application Priority Data

Dec. 30, 2016   (IN) .............................. 201641044984

(51) Int. Cl.
*H04L 29/08*   (2006.01)
*H04L 12/803*   (2013.01)
(Continued)

(52) U.S. Cl.
CPC ........ *H04L 67/1008* (2013.01); *H04L 47/125* (2013.01); *H04L 47/765* (2013.01);
(Continued)

(58) Field of Classification Search
CPC . H04L 67/1008; H04L 47/803; H04L 47/125; H04L 67/1014; H04L 67/1025;
(Continued)

(56) References Cited

U.S. PATENT DOCUMENTS 6,944,785 B2   9/2005   Gadir
7,461,130 B1   12/2008   Abdelaziz
(Continued)

OTHER PUBLICATIONS

PCT; App. No. PCT/US2017/068887; International Search Report and Written Opinion dated Mar. 16, 2018.
(Continued)

*Primary Examiner* — Brian J. Gillis
*Assistant Examiner* — Chhian (Amy) Ling
(74) *Attorney, Agent, or Firm* — Fitch, Even, Tabin & Flannery LLP

(57) ABSTRACT

Some embodiments provide self-organizing retail resource load sharing systems comprising: a cluster of a set of node systems that receive resource requests; multiple different resource systems that implement predefined tasks consistent with the resource requests; wherein the node systems: access a valid ownership allocation configuration; confirm when a first node system is currently defined as the owner of a first resource system and authorizing activation of the corresponding first resource system when the resource request is intended for the first resource system; and cause the first node system to operate as a proxy and communicate the first resource request to a different embedded allocation application on a second node system that currently owns a second resource system when the first resource request is intended for the second resource system. Typically, the self-organizing load sharing is provided without external coordinators and reduced infrastructure, while providing high resource availability and reliability.

19 Claims, 10 Drawing Sheets

(51) Int. Cl.
*H04L 12/919* (2013.01)
*H04L 12/927* (2013.01)

(52) U.S. Cl.
CPC ........ *H04L 47/803* (2013.01); *H04L 67/1025* (2013.01); *H04L 67/2833* (2013.01); *H04L 67/327* (2013.01); *H04L 67/1014* (2013.01)

(58) Field of Classification Search
CPC .. H04L 67/2833; H04L 67/327; H04L 47/765
See application file for complete search history.

(56) References Cited

U.S. PATENT DOCUMENTS

| | | |
|---|---|---|
| 7,712,102 B2 | 5/2010 | Herington |
| 8,024,600 B2 | 9/2011 | Sciacca |
| 8,140,651 B2 | 3/2012 | Pappas |
| 8,370,416 B2 | 2/2013 | Hoover |
| 9,037,712 B2 | 5/2015 | Rafiq |
| 2006/0015773 A1 | 1/2006 | Singh |
| 2009/0070623 A1* | 3/2009 | Sciacca ................. G06F 9/5083 714/4.1 |
| 2010/0011340 A1* | 1/2010 | Pandey ..................... G06F 8/20 717/107 |
| 2010/0211958 A1 | 8/2010 | Madison, Jr. |
| 2010/0299419 A1 | 11/2010 | Ramankutty |
| 2011/0016090 A1* | 1/2011 | Krishnaprasad .... H04L 67/2842 707/648 |
| 2011/0154350 A1 | 6/2011 | Doyle |
| 2013/0262556 A1 | 10/2013 | Xu |
| 2014/0047413 A1* | 2/2014 | Sheive ................. H04L 65/403 717/110 |
| 2016/0239350 A1 | 8/2016 | Kamawat |
| 2017/0187820 A1* | 6/2017 | Vangala .............. H04L 67/2842 |

OTHER PUBLICATIONS

Wikipedia; "Hazelcast"; https://en.wikipedia.org/wiki/Hazelcast; available at least as early as Dec. 17, 2016; pp. 2-4.

* cited by examiner

SELF-ORGANIZED RETAIL SOURCE REQUEST ROUTING AND DISTRIBUTED LOAD SHARING SYSTEMS AND METHODS

CROSS-REFERENCE TO RELATED APPLICATION

This application claims the benefit of India Application No. 201641044984, filed Dec. 30, 2016, which is incorporated herein by reference in its entirety, and this application claims the benefit of U.S. Provisional Application No. 62/464,784, filed Feb. 28, 2017, which is incorporated herein by reference in its entirety.

TECHNICAL FIELD

This invention relates generally to distributed systems and distributing access to resource systems.

BACKGROUND

Some systems utilize numerous different resource systems, and different client systems attempt to direct resource requests to utilize these resource systems. In many applications, these systems use a load balancer that controls the load distribution in the distributed system to nodes in the system to handle the resource requests.

BRIEF DESCRIPTION OF THE DRAWINGS

Disclosed herein are embodiments of systems, apparatuses and methods of load sharing resource systems. This description includes drawings, wherein.

Figure 1:
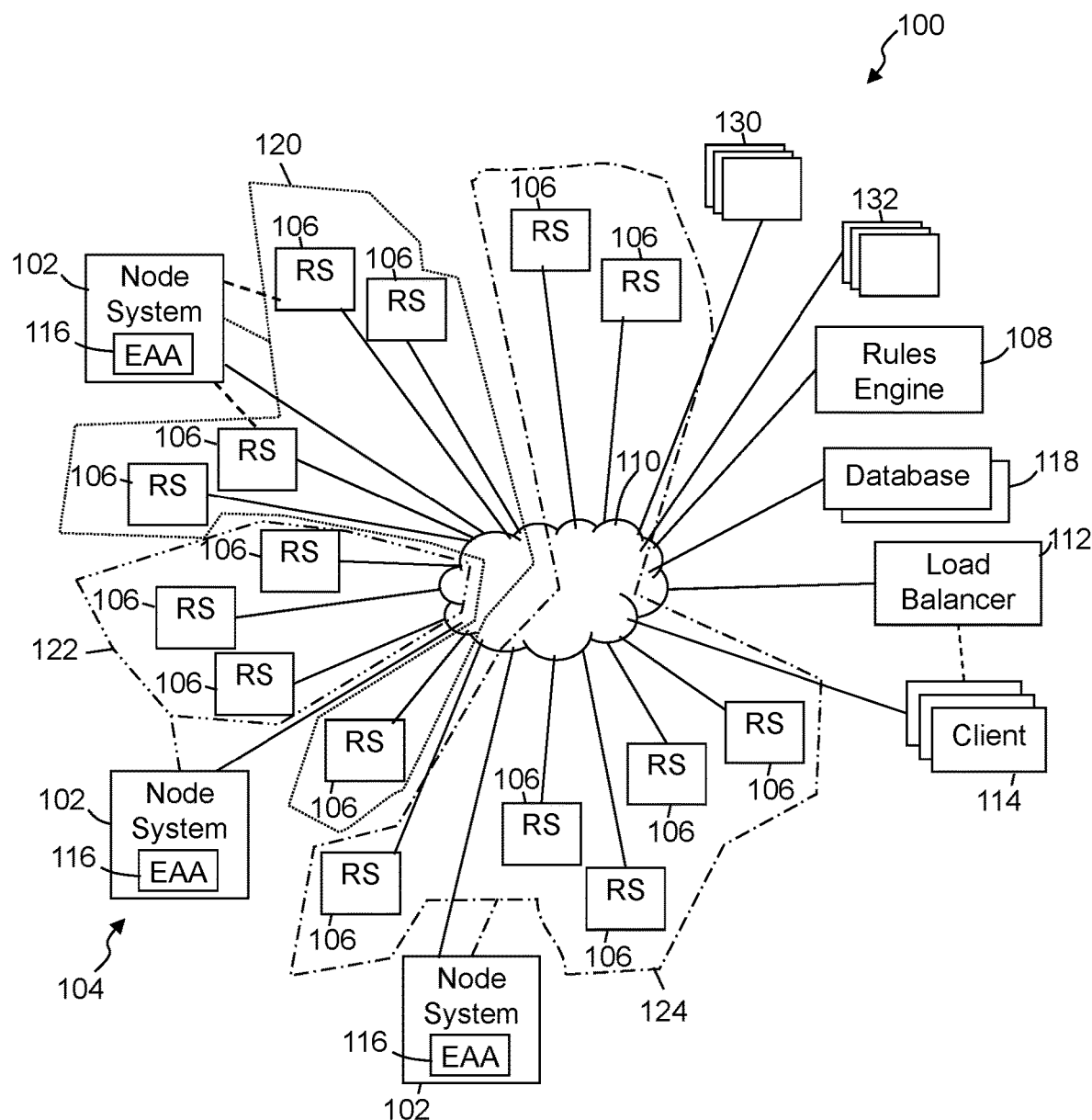
FIG. 1 illustrates a simplified block diagram of an exemplary source load sharing system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to m a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to organize load sharing and request routing of resource systems to implement resource requests. Some embodiments provide a resource load sharing system that includes a cluster of a set of multiple operative node systems communicatively coupled. Further, the node systems are communicatively coupled with a separate load balancer and receive different resource requests from the load balancer that distributes the resource requests across the multiple node systems, and in some instances the load balancer randomly distributes the resource requests across the multiple node systems. In some embodiments, the system includes one or more rules engines, a rules database and/or other system that maintains a set of resource routing and allocation rules. The system includes and/or communicatively couples with multiple different resource systems that are configured to each implement predefined tasks consistent with the resource requests. Examples of resource systems include, but are not limited to printers, digital memory, data logging systems, control circuitry, camera systems, communications systems, and other such systems that perform predefined tasks.

The node systems are configured so that each of the different resource systems is communicatively coupled over a communication network, and typically can be accessed by the node systems. In some embodiments, each of the multiple node systems comprises a node control circuit and an embedded allocation application (EAA). Typically, the embedded allocation application is implemented by the node control circuit accessing code, software and the like stored on local and/or remote memory. The embedded allocation applications are configured to communicate with the other embedded allocation applications implemented on the node systems. Further, the embedded allocation applications are configure to apply one or more routing and/or allocation rules from the set of resource allocation rules to cooperatively define a resource ownership allocation configuration that dictates ownership of each of the resource systems exclusively to one of the multiple node systems. By defining the exclusive ownership of the resource systems to a node system, each owner node system exclusively has access to implement the corresponding task performed by the resource system while the ownership allocation configuration is valid across the multiple node systems, and the other node systems cannot control or direct resource requests to those resource systems that are not defined as owned by the node system.

In such situations and with such system constraints, high availability is a big concern. For example, often resource systems, such as label printers, package stamping systems, packing systems, and other such resource systems typically do not have the capability to accept concurrent requests from multiple different devices, and often requests to such systems are to be executed serially (e.g., based on packages progressing along a convey system). Further, some requests to a resource system expect to receive an acknowledge and/or the resource system has to return a response back to the requesting device. Typically, however, such resource systems (e.g., label printers, stamping systems, etc.) do not maintain requesting device identifying information and/or are incapable of maintaining such information. If requests related to multiple requesting node systems are sent to a single resource system, acknowledgements from that single resource system cannot be sent to the proper requesting node system. Further, in some implementations, the resource system is intentionally established to maintain only one connection to a resource system at a time so that that resource system is efficient in executing high throughput stream of requests. Accordingly, some present embodiments improve the utilization of resource systems to provide efficient and reliable operation. Further, some present embodiments provide a simplified operation with redundancy to drastically improve reliability and load distribution without external coordinators, reduced infrastructure, reduced costs, improved operating effectiveness and simplified continued management and maintenance.

Each of the node systems further accesses, through respective embedded allocation applications, the valid ownership allocation configuration in response to receiving a resource request from the load balancer and activates a corresponding resource system of the multiple resource systems currently owned by the correspond node system when the resource request is intended for the resource system owned by the node system. Further, each of the embedded allocation applications is configured to enable a node system to operate, based on an ownership allocation rule of the set of routing and/or resource reallocation rules, as a proxy and communicate a resource request to a different embedded allocation application on a different node system that currently owns a second resource system in accordance with the ownership allocation configuration when the resource request is intended for the second resource system.

FIG. 1 illustrates a simplified block diagram of an exemplary request routing and source load sharing system 100, in accordance with some embodiments. The load sharing system includes at least a set of multiple node systems 102 that make up at least one cluster 104 and multiple resource systems 106. In some embodiments, the system includes one or more rules engines 108, allocation rules database 118, and/or other databases. In some embodiments, the node systems are communicatively coupled over one or more communication and/or computer networks 110. Further, the node systems are typically communicatively coupled with at least one load balancer 112, which may couple directly with one or more of the node systems 102 and/or may couple via the one or more networks with the node systems. The load sharing system can be implemented in retail environments, such as in distribution centers, fulfillment centers, retail stores and other such retail environments, in commercial environments, in banking environments, and other relevant environments where numerous resource systems are available within a system and control over those resource systems is implemented through specific node systems.

The cluster 104 of a set of multiple node systems 102 can include one or more node systems 102. The node systems further communicatively coupled with the separate load balancer 112 directly or via the one or more networks 110 and are configured to receive resource requests from the load balancer. The resource requests are received from multiple different client systems 114 that communicate the resource requests to be performed. The client systems may communicate the resource request through the one or more networks 110 and/or may directly couple with the load balancer. In some embodiments, the load balancer 112 distributes the resource requests across the multiple node systems 102. The distribution may be based on a schedule (e.g., sequentially, based on timing, etc.), based on a client device sending the request, based on a type of resource request, randomly, or other such distribution, or determined based on a combination of two or more of such considerations. The resource requests can be substantially any relevant resource request that is to be performed by one of the resource systems 106. The multiple different resource systems 106 are each configured to implement one or more predefined tasks that are consistent with the resource requests. In some instances, the resource request may be directed to a specific resource system, while in other instances the resource request can be directed to any one of a subset of multiple resource systems 106. As a non-limiting example, a resource request may be a print resource request, which may be implemented by any of multiple different printer resource systems, label application request to be implemented by one of multiple different label application resource systems, a stamp request to be implemented by one of multiple different stamp resource systems, a packaging request to be implemented by a packaging insertion resource system, a package wrapping request to be implemented by one of multiple different wrapping resource systems, data logging requests to be logged by a logging resource system, imaging requests to be implemented by one or more imaging systems, and other such requests that are implemented by physical resource systems. As a further example, product fulfillment facilities often include multiple conveyor systems that convey products in preparation for shipping and subsequent delivery. Accordingly, multiple sensors systems 130 (e.g., bar code sensors, RFID sensors, text capture systems, image capture and processing sensor systems, weight sensor systems, dimension sensor systems, etc.) are positioned along various parts of one or more conveyor systems 132. These sensors can be used to identify and track products and/or packages onto which one or more products have been placed as they progress along the conveyor systems. The sensor data can, for example, identify a particular product, and be used to instruct one of multiple different physical packaging resource systems to cause the product to be placed into a box for shipment. Sensor data can similarly be used to cause a packaging material request (e.g., bubble wrap, styrofoam, etc.) to be communicated to one of multiple different material packing system resources to add relevant packaging materials. As a further example, label printing requests can be communicated to one or multiple different printer resource system to print delivery labels to be affixed to different packages. In many fulfillment centers, such package processing includes the processing of thousands of packages an hour. Failure of one of these resource systems and/or the node systems to direct requests to these resource systems can result in significant backlogs, delays, costly errors and other problems. Accordingly, the present embodiments provide improved redundancy and reliability, while further providing enhanced work load distribution, balancing and efficiency.

A plurality of the different resource systems 106, and in some implementations each of the resource systems, are communicatively coupled over the network 110, and typically accessible by two or more node systems 102, which allows node systems to direct the operation of resource systems when designated as the owner of the resource system. In some embodiments, the node systems include a node control circuit and an embedded allocation application (EAA) 116. The embedded allocation applications are each configured to communicate with the other embedded allocation applications implemented through the set of multiple node systems of the cluster 104. Further, the embedded allocation applications, in some embodiments, communicate and cooperatively operate as an allocation system. In some embodiments, the embedded allocation applications form a socket connection during startup of each node (e.g., which may be implemented in part through TCP/IP, or other relevant coupling). This connection enables data transfer and data access across the node systems. It utilizes part of system memory to store data. Further, in some implementations each embedded allocation application in one of the node systems maintains data, parameters, schedule, allocation data and other relevant data local on that node system 102 for the operation of that embedded allocation application. This data is typically further stored in cache memory of the node system providing rapid processing and response enabling improved real-time operation. Some embodiments provide storage as distributed cache capability provided by the embedded allocation applications. This cache utilizes system memory and enables quick look-up and updates is accessible across the node systems. Since it is local to each node system, performance is very fast and external storage needs and access requests are significantly reduced and/or eliminated. Some embodiments utilize external storage as additional backup.

Further, in some embodiments, each embedded allocation application of the multiple different node systems is backed up by duplicating the embedded allocation application and/or application data in portions across multiple other nodes providing redundancy and enhanced reliability. The embedded allocation applications utilize local node system memory to store data for implementing the local embedded allocation application, and further each embedded allocation application stores a backup of parts of one or more other embedded allocation application data (serves as replica) in the cluster. Even if one embedded allocation application goes down, there is no data loss. For example, each embedded allocation application maintains its owns operating parameters, data and the like, while further storing part of the data and stores backup of one or more other embedded allocation application data (serves as replica) of at least part of one or more other embedded allocation applications in the cluster. In some instances, the data for each embedded allocation application is duplicated multiple times as separate parts on multiple different node systems (e.g., the operating parameters and data for node 1 may be stored as a first part on nodes 2 and 3, a second part stored on nodes 3 and 4, a third part stored on 5-7; operating parameters and data for node 2 may be stored as a first part on nodes 1 and 3, a second part stored on nodes 3-5, a third part stored on nodes 3 and 4; etc.). As such, even if one embedded allocation application goes down, there is no data loss. Thus, some embodiments implement distributed cache backup and redundancy enabling quick data access, recovery and/or data updates across the node systems. Allocation rules may additionally or alternatively be stored in external storage or one or more external files, which may be system specified (e.g., defaults) and/or configurable by the user. Further, such allocation rules are loaded into distributed cache of different and/or each embedded allocation applications for quick access (e.g., as key-value pairs of metadata).

In some embodiments, the multiple embedded allocation applications 116 are configure to apply one or more rules from one or more sets of resource allocation rules to cooperatively define a resource ownership allocation. The allocation rules engine 108, database 118, and/or other such systems are configured to maintain one or more sets of resource allocation rules that are utilized by the node systems in determining resource ownership allocation configurations (OAC). The rules engine may be maintained by one or more of the embedded allocation applications, 116, one or more node control circuits of one or more node systems, a separate rules engine with a rules engine control circuit and memory, and/or other such systems. The ownership allocation configurations, when current and valid, dictate ownership of each of the resource systems 106 exclusively to one of the multiple node systems. For example, a first node system 102 may be defined as owning a first subset 120 of one or more resource systems, a second node system may be defined as owning a second set 122 of one or more resource systems, and a third node system may be defined as owning a third set 124 of one or more resource systems.

Based on the defined ownership, an owner node system exclusively has access to initiate the implementation of the corresponding task performed by the corresponding resource system while the ownership allocation configuration is valid across the multiple node systems. Over time, the ownership allocation configuration can change, which can change ownership of one or more resource systems to different node systems. While an ownership allocation configuration is valid and currently dictating ownership, resource requests can be implemented by the owner node system, typically the other node systems cannot directly activate non-owned resource systems. In some embodiments, an owner node system has exclusive control over a resource system that is designated as owned by that owner node system, and resource requests are implemented through the owner node system. The load sharing system 100 uses the resource allocation configuration to share the load of resource requests and to route requests to appropriate node systems without an external coordinator thereby saving infrastructure, and reducing maintenance overhead. The node systems implement the embedded allocation application providing the cooperative capability to define ownership of resource systems to the node systems, and can further provide high availability of the system through the self-organizing to update and adjust the resource ownership allocation configuration. Resource ownership allocation and/or updated reallocation may be triggered, for example, when a node in the cluster goes down, new node gets added in the cluster, one or more resource systems are added or removed, based on an evaluation of load distribution, and/or other such triggers. Similarly, the system can adjust the resource ownership allocation configuration over time to compensate for changing loads on one or more node systems.

Figure 2:
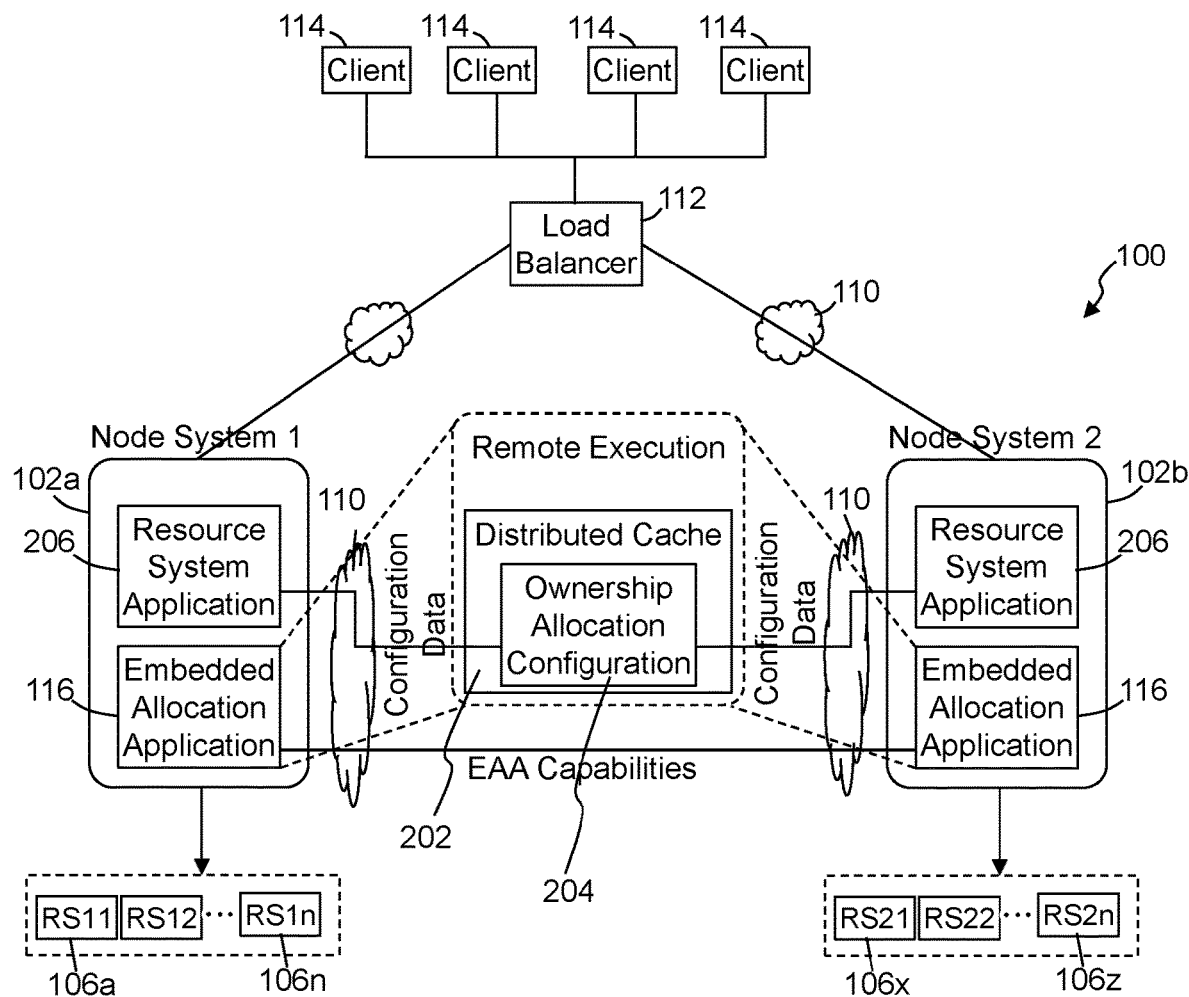
FIG. 2 illustrates a simplified block diagram of a functional representation of an exemplary retail source load sharing system, in accordance with some embodiments.

FIG. 2 illustrates a simplified block diagram of a functional representation of an exemplary source load sharing system 100 in accordance with some embodiments. Multiple node systems 102a-102b, are communicatively coupled with the load balancer system 112 via the one or more networks 110 to receive resource requests initiated by one of multiple different client systems 114. The node systems are further communicatively coupled with multiple resource systems 106 each configured to perform at least one predefined task. Embedded allocation applications 116 are implemented on each node system. In some embodiments, the embedded allocation applications cooperatively operate to provide an allocation system 202. Each node system 102 includes one or more resource system applications 206 that are implemented to allow the node system to activate and/or control each of one or more resource systems that the node system is capable of directing operation consistent with the resource allocation configuration. For example, a resource system application may include a printer driver and corresponding printer parameters to control a printer resource system. As another example, the resource system application and/or the embedded allocation application 116 access the defined resource ownership allocation configuration 204, which may be cached on a node system and/or distributed to multiple or all of the node systems. In some embodiments, the embedded allocation application identifies the new ownership configuration when a node goes down or node comes up. For example, the oldest node system in the cluster uses the configuration and submits requests to the other node systems in the cluster through the embedded allocation application remote execution capabilities. The status of this execution can be maintained, for example, in embedded allocation distributed cache.

Referring to FIGS. 1-2, one or more of the embedded allocation applications, and in some instances multiple embedded applications cooperative operate, to define the resource ownership allocation configuration 204. In some embodiments, the embedded allocation applications cooperatively operate to implement a load sharing system that maintains and implements the routing and allocation rules. Further, in some implementations, the embedded allocation applications cooperatively operate to maintain and update a cache storing the currently valid ownership allocation configuration at each of the node systems, and routing and allocation rules. In some embodiments, one of the node systems 102 is defined as a master or primary node system that controls and/or implements the load sharing system, receives notifications of changes to the cluster, initiates the revisions to change the ownership allocation configuration, and/or takes or initiates other such actions.

The node systems and/or the embedded allocation applications further access the valid ownership allocation configuration in response to the node system receiving a resource request, typically from the load balancer 112. Again, the load balancer distributes the resource requests across the multiple node systems 102 of the cluster, and in some instances randomly distributes the resource requests across the node systems. Again, load balancers typically do not have the capability to maintain and use ownership allocations in real-time. In some embodiments, based on the currently valid ownership allocation configuration, the node system and/or embedded allocation application of a node system receiving the resource request is configured to confirm when a node system is currently defined as the owner of a corresponding resource system and authorize the activation of the corresponding resource system of the multiple resource systems when the resource request is intended for the resource system. In other instances, based on the currently valid ownership allocation configuration, the embedded allocation application of the node system receiving the resource request, can cause the node system to operate, based on one or more ownership allocation rules of the set of resource allocation rules, as a proxy system. Because the load balancer is unaware of the allocation of the resource systems, it is unable to effectively distribute the resource requests. The source load sharing system 100, however, provides a system that operates within the network and does not have to have external infrastructure or systems to provide the routing and/or define the allocation of resource systems. In some embodiments, embedded allocation application 116 is configured to communicate between the nodes systems 102. Further, in some embodiments the embedded allocation applications are configured to maintain the valid ownership allocation configuration, which is accessible by all of the node systems of the cluster and maintained by one or more embedded allocation applications. In some embodiments, the embedded allocation applications access and/or store source request routing and allocation rules, which in some instances is implemented in part through distributed cache and may be locally stored on each node system. Additionally, the embedded allocation applications are configured to cooperatively identify node systems joining and leaving the cluster, as well as updating the ownership allocation configuration in response to node systems and resource systems joining and leaving the cluster. In some embodiments, the embedded allocation applications are configured to collectively select a master node, distribute notifications to the node systems, and other functions.

In some embodiments, one of the node systems can be designated as master node system and/or an embedded allocation application on a node system can be designated a master allocation application. The master embedded allocation application can be configured to coordinate the operation of the other embedded allocation applications to cooperatively provide the embedded allocation system. In some applications, the master embedded allocation application applies the routing and allocation rules to define the resource ownership allocation configuration, which may include evaluating parameters and/or data based on one or more thresholds, applying balancing of loads, and/or other such processing. In some embodiments, an initial node system to join the cluster may be defined as a master. Some embodiments perform an evaluation of processing capacity of the node systems, resource system load of node systems, processing bandwidth of node systems, and/or other such parameters in selecting a master allocation application and/or node system. In some embodiments, the embedded allocation applications evaluate processing capabilities and/or load by distributed cache capabilities backed by external storage. Node systems, in some implementations, continuously monitor and measure local operations and can distribute that information. For example, a master node may be selected by the embedded allocation application (e.g., oldest node system in the embedded allocation application cluster is marked as master node). The reliability of the continued operation of resource systems and the allocation of workloads can be critical when, for example, thousands or tens of thousands of packages are processed daily in real-time. The tunnel communication across the node systems and the cooperated operation of the embedded allocation applications allows the system to operate at high speeds with increased accuracy and reliability, and providing rapid real-location in response to a change in the system (e.g., failure of a system node, failure of a resource system, addition of a system node or resource system, etc.). Additionally or alternatively, some embodiments elect the master allocation application that has been part of the cluster the longest duration. Further, the embedded allocation applications collectively operate to designate a master allocation application, and further designate a replacement master allocation application and/or node system when the current master allocation application is disabled, losses communication with the cluster, is removed from the cluster, or is otherwise incapable of continuing to operate as a master. In some embodiments, the allocation rules are accessed and evaluated in selecting the node system to operate the master embedded allocation application and/or the embedded allocation application to be the master allocation application.

Figure 3:
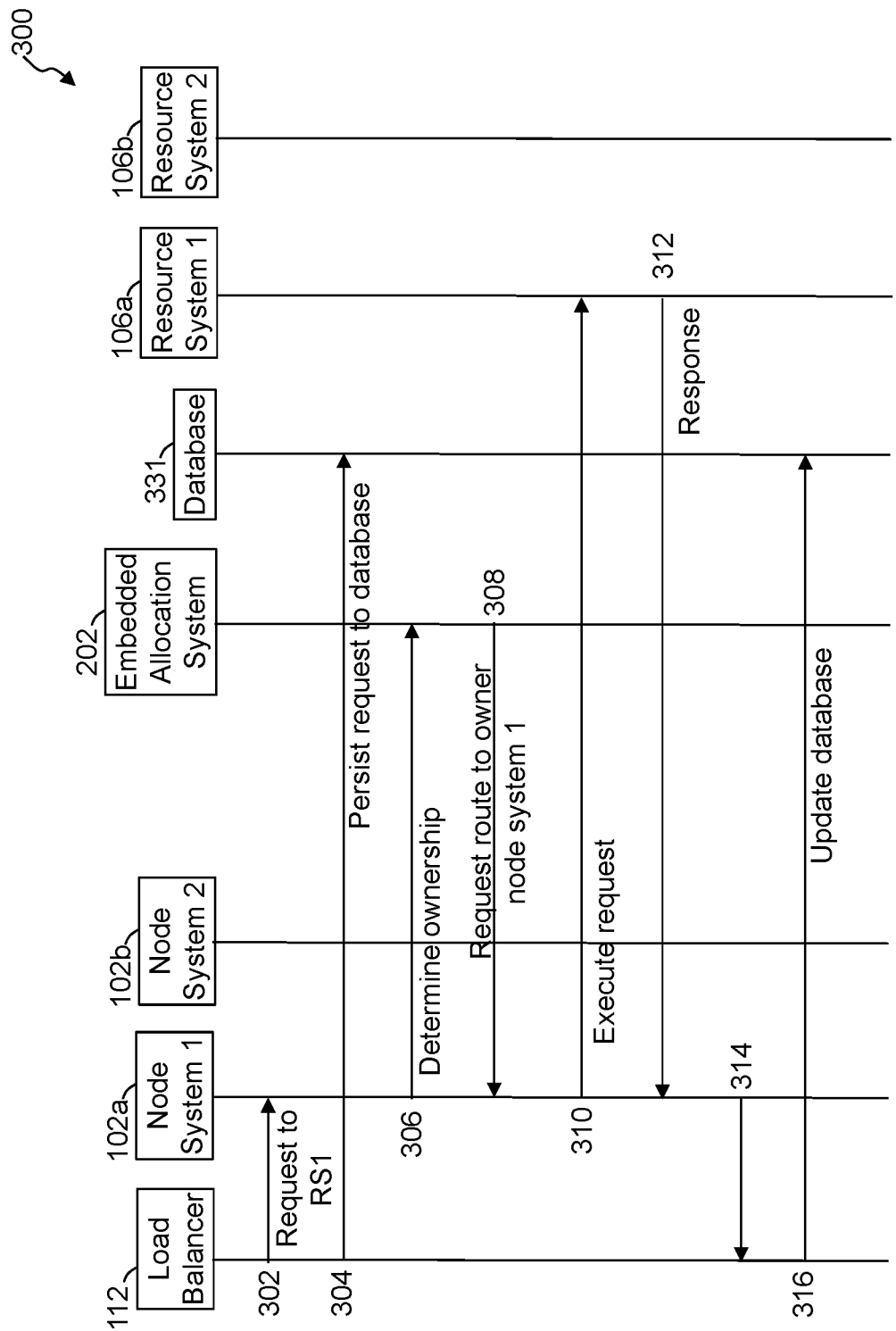
FIG. 3 shows a simplified functional diagram illustrating an exemplary process of implementing a resource request when the resource request is directed to a node system that owns the resource system, in accordance with some embodiments.

FIG. 3 shows a simplified functional diagram illustrating an exemplary process 300 of implementing a resource request when the resource request is directed to a node system that owns the resource system (e.g., first resource system 106a) intended to perform the resource request, in accordance with some embodiments. As described above and further below, the resource request may be a print request, stamp request, packaging request, retrieval request, routing request, memory storage and/or logging request, and/or other such requests of physical resource systems. For example, a resource request may include a label printing request to be applied to on packages to be shipped from a distribution center or warehouse. Packages to be shipped are moved by automated machinery (e.g., conveyor systems) a coming in sequence. Sensor data of the automated machinery identify and/or track products and notify the node systems and/or resource systems. This information, for example, is used by the resource systems in identifying when to activate the relevant print. For example, labeling and/or barcodes may be generated by the printer resource system based on the package and sensor data. In step 302, the load balancer 112 distributes a resource request to a first node system 102a. Again, the load balancer may distribute resource requests based on a random distribution, based on a schedule, or on one or more other factors. As such, the distributed resource request may be directed to the node system that is currently defined as the owner, while in many instances the resource request is directed to a node system that does not currently own the resource system intended to implement the resource request. Some embodiments include optional step 304 where the resource request is logged and/or other information is maintained in a database 331.

In step 306, the node control circuit notifies the embedded allocation application of the resource request such that the embedded allocation application identifies that the resource request is received. The node system obtains an identifier of the intended resource system 106 from the request, and accesses the valid and current resource allocation configuration. Additionally or alternatively, one or more rules from the set of configured rules may be evaluated relative to the resource request and the intended resource system. In step 308, the node system, based on the identified resource system and the resource ownership allocation configuration, determines that the first node system 102a is the owner of the first resource system 106a. In step 310, the first node system communicates the resource request and/or issues one or more commands to the first resource system 106a to cause the resource system to implement the predefined task corresponding to the resource request. For example, a print command and relevant data to be printed and/or to control the printing can be communicated to the first resource system.

With some resource requests, a resource system may return a confirmation and/or communicate information back to the first node system intended for the client system that issued the resource request. As such, some embodiments include optional step 312 where one or more relevant responses are communicated to the first node system. In optional step 314, the first node system may communicate some or all of the one or more relevant responses to the load balancer 112 to be communicated to the requesting client system 114 or other relevant destination system. Some embodiments include optional step 316 where the load balancer updates the database 331 with log-information and/or other relevant information.

In some embodiments, the embedded allocation application causes the node system to operate as a proxy when a resource request received at the node system is intended for a different resource system that is currently defined as owned by a different node system. The node system can communicate the resource request to a different embedded allocation application on the different node system that is defined as the current owner of the resource system in accordance with the ownership allocation configuration.

Figure 4:
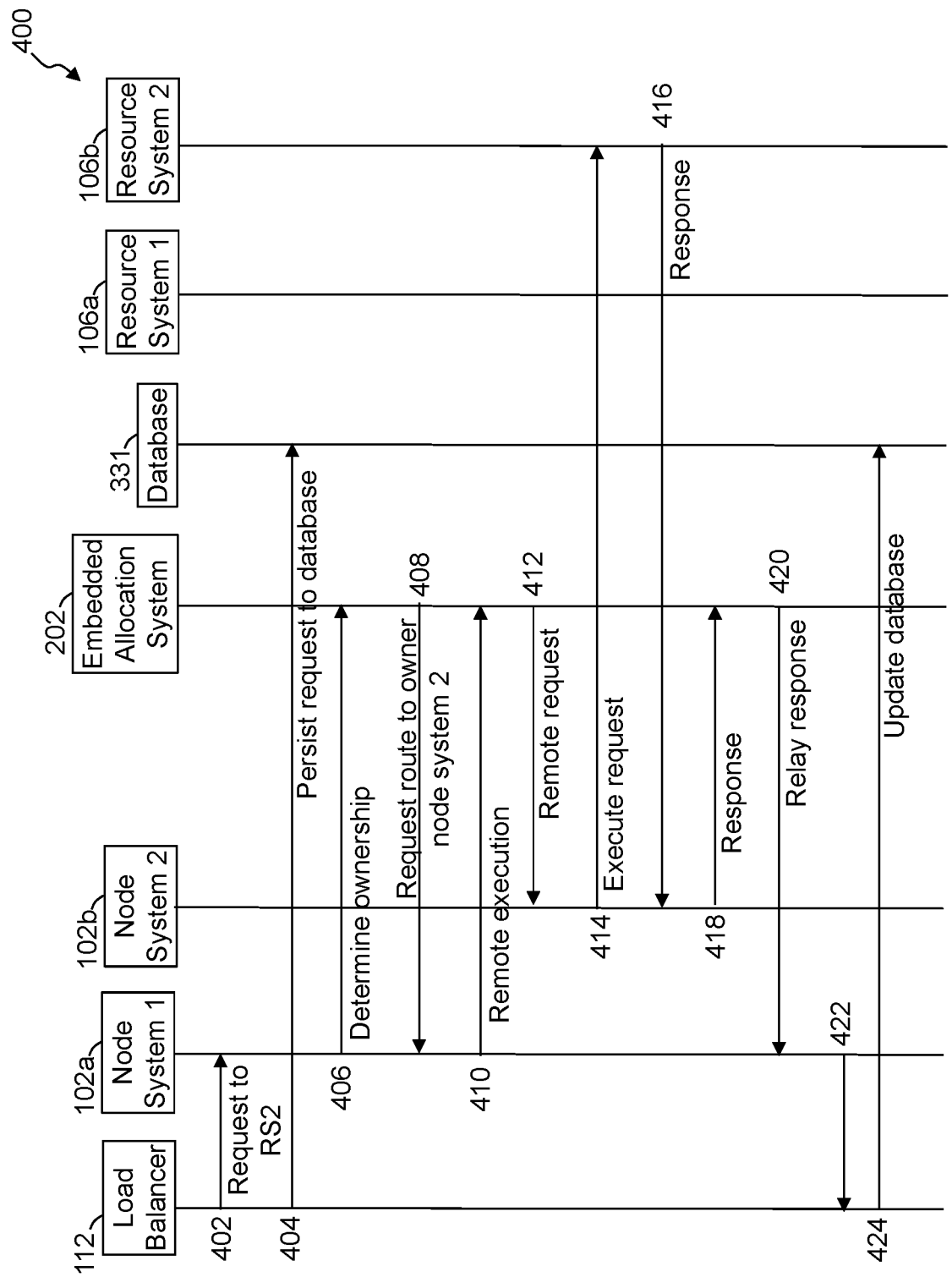
FIG. 4 shows a simplified functional diagram illustrating an exemplary process of implementing a resource request when the resource request is directed to a node system that does not own the resource system, in accordance with some embodiments.

FIG. 4 shows a simplified functional diagram illustrating an exemplary process 400 of implementing a resource request when the resource request is directed to a node system that does not own the resource system (e.g., second resource system 106b) intended to perform the resource request, in accordance with some embodiments. In step 402, the load balancer 112 distributes a resource request to a first node system 102a. Some embodiments include optional step 404 where the resource request is logged and/or other information is maintained in a database 331.

In step 406, the node control circuit notifies the embedded allocation application of the resource request such that the embedded allocation application identifies that the resource request is received. The first node system obtains an identifier of the second resource system 106b to which the resource request is directed, and accesses the valid and current resource allocation configuration. Based on the identified resource system and the resource ownership allocation configuration, the first node system determines that the second node system 102b is currently the defined owner of the second resource system 106b, and not the first node system 102a. In step 408, the first node system identifies that it is not the owner of the second resource system.

In step 410, the embedded allocation application of the first node system directs the first node system to operate as a proxy and causes the resource request to be transferred to the second node system 102b through the second embedded allocation application operating on the second node system. In step 412, second embedded allocation application identifies that the resource request is received by the second node system and that the resource request is directed to be implemented by the second resource system 106*b*, and causes the resource request to be communicated to the second node system 102*b*. In step 414, the resource system application of the second node system initiates a communication from the second node and/or issues one or more commands to the second resource system 106*b* to cause the activation of second resource system to implement the predefined task corresponding to the resource request. For example, a memory access command can be communicated to the second resource system.

Some embodiments include optional step 416 where the second node system 102*b* may identify that a response is received from the second resource system 106*b* in response to the resource request. The response may be a confirmation of completion, returned data, and/or other such information. Some or all of the response from the second resource system may be intended for the requesting client system that issued the resource request and/or the load balancer. In optional step 418, the second embedded allocation application causes a response, which may include some or all of the response from the resource system, to be relayed and/or communicated through the embedded allocation system 202, and be received at the first node system 102*a* operating as the proxy in optional step 420. In optional step 422, the first node system can communicate some or all of the relayed response to the load balancer 112 and/or to be directed to the requesting client system or other relevant destination system. Some embodiments include optional step 424 where the load balancer 112 updates the database 331 with log-information and/or other relevant information.

The embedded allocation system 202 is further configured to be dynamic to enable the addition of one or more node systems, the removal or loss of one or more node systems, and similarly the addition or removal of one or more resource systems 106. In some embodiments, one or more of the embedded allocation applications is configured to apply one or more allocation resource rules of the set of resource allocation rules, in response to receiving a notification communicated to the embedded allocation applications by a new embedded allocation application on a new node system that is attempting to initially joining the cluster 104 of the set of multiple node systems to reallocate the resource systems across the previous and new node systems. Based on the one or more resource allocation rules, the one or more embedded allocation applications define a revised resource ownership allocation configuration that dictates ownership of each of the resource systems. In some instances, the revised ownership allocation configuration changes ownership of one or more, and typically a plurality of the resource systems that were defined to be owned by one or more of the set of node systems, to be defined as exclusively owned by the newly joined node system. Further, in some embodiments the revised ownership allocation configuration may transition ownership of one or more resource systems between node systems that were previously part of the cluster. Similarly, one or more of the embedded allocation applications can define a revised ownership allocation configuration when a node system is overloaded, and/or implementing threshold quantities of resource requests. The ability to readily revise the ownership allocation configuration enables the system to have a high availability of resources, and limits failures and/or prevents single points of failure. Further, the revising of the ownership allocation configuration is self-organizing by the embedded allocation applications and does not need manual intervention.

Figure 5:
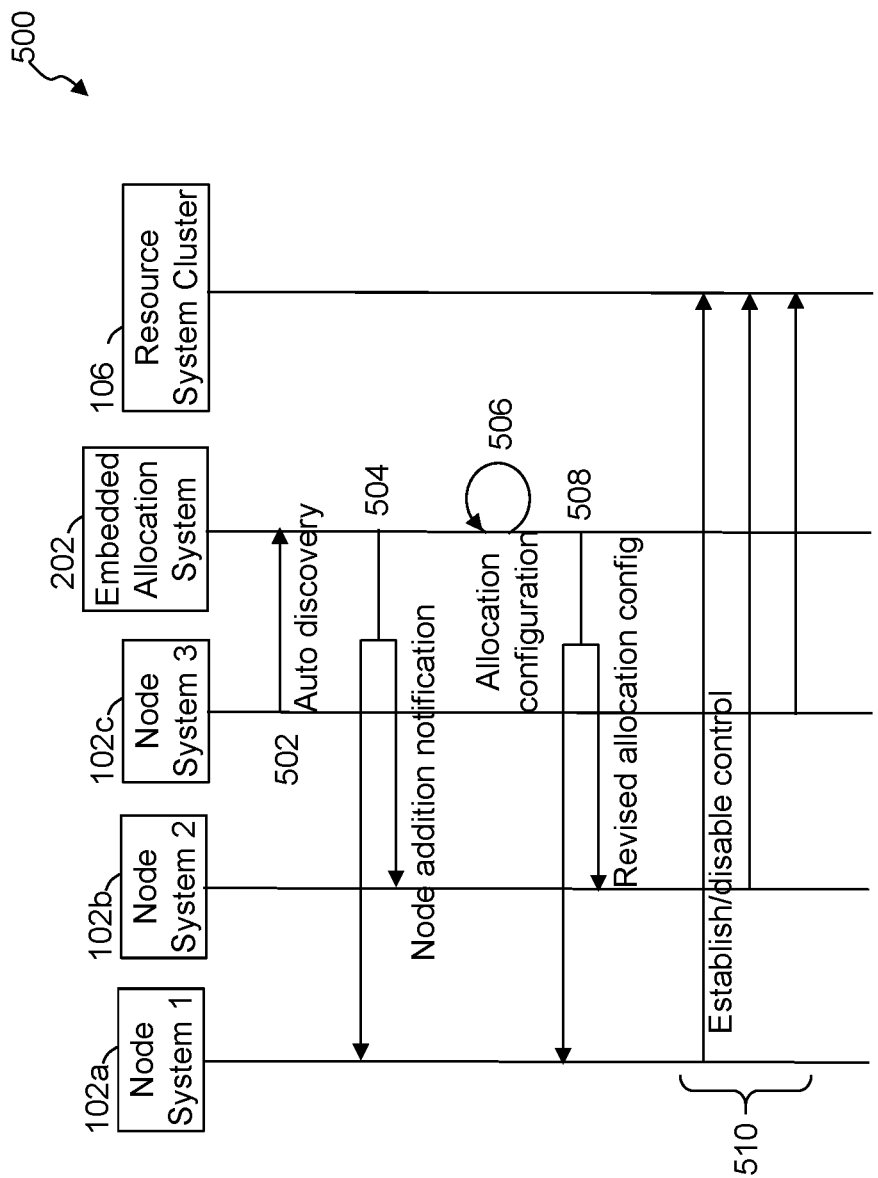
FIG. 5 shows a simplified functional diagram illustrating an exemplary process of incorporating an additional node system into a source load sharing system, in accordance with some embodiments.

FIG. 5 shows a simplified functional diagram illustrating an exemplary process 500 of incorporating an additional node system 102 into a source load sharing system 100, in accordance with some embodiments. In step 502, a node system 102*c* attempting to join the cluster 104 issues a request to join the cluster. In some instances, the embedded allocation application implemented on the new node system 102*c* detects the cluster based on an automated discovery application and communicates a notification of the nodes availability to the cluster and/or requests to join the cluster. In step 504, the embedded allocation system 202 receives notification of the new node system. In some implementations, the node systems already defined as part of the cluster are notified of the new node system. Further, the notification can be directed to one or more embedded allocation applications implemented on one or more node systems already defined as part of the cluster, and in some instances communicated to a node system that has been defined as a primary or master node system.

In step 506, the embedded allocation system 202 accesses the current resource ownership allocation configuration, identifies the available resource systems 106 (sometimes referred to collectively as a resource cluster), and applies one or more routing and allocations rules in defining a revised resource ownership allocation configuration redefining the ownership of the multiple resource systems between the set of node systems 102. In some embodiments, one or more of the embedded allocation applications apply one or more routing and/or allocation rules of the set of resource allocation rules, in response to receiving a notification communicated to the embedded allocation applications of the multiple node systems. In some implementations, the notification is initiated by the embedded allocation application on a node system 102*c* initially joining the cluster. Based on the rules, one or more of the embedded allocation applications reallocate the resource systems, including at least the new resource system and defines a revised resource ownership allocation configuration that dictates ownership of each of the resource systems, which may change ownership of a plurality of the resource systems.

The routing and allocation rules can consider one or more factors in defining the ownership, and the number of resources systems and number of node systems available. Further, in some embodiments, the rules consider resource request loads directed to different resource systems 106 and/or node systems 102, rate of resource requests, task loads of one or more resource systems, historic resource requests, capabilities of node systems, maintenance schedules, other such factors, and typically a combination of such factors. For example, some rules may define an approximate equal distribution of numbers of resource systems to each node system (e.g., an even distribution between node systems based on a number of resource systems). As another example, one or more rules may affect the distribution of resource systems in attempts to balance resource requests to be handled by the different node systems. As another example, one or more rules may affect the distribution of resource systems based on historic time to implement resource requests at different resource systems, historic relative size or complexity to implement resource requests, and/or other such factors in attempts to distribute the "workloads" across different node systems. Some embodiments, consider historic rates of requests directed to particular resource nodes in attempts to balance the number of resource requests managed by a node system. Other factors such factors may alternatively be considered, while in some embodiments, two or more of such factors are considered in revising the resource ownership allocation configuration. In some implementations, the revising of the resource ownership allocation configuration includes accessing the existing resource ownership allocation configuration, historic errors, and/or other such information. As an example, an embedded allocation application in applying one or more rules evaluates historic and/or current task loads relative to one or more thresholds, relative to current and/or historic task loads of each of the multiple node systems and/or resource systems nodes, and defines the revised resource ownership allocation configuration based on the task loads of the multiple resource systems.

In step 508, the revised resource ownership allocation configuration is distributed to each of the node systems 102 (e.g., 102a, 102b, 102c) of the cluster. In step 510, each of the node systems establishes a communication connection with and control over those resource systems 106 for which it has ownership, and disables control over those resource systems over which the node system previously had ownership and no longer has ownership over based on the revised resource ownership allocation configuration. Again, in some embodiments, the resource ownership allocation configuration defines that a single resource system 106 is controlled by a single node system 102 during a period of time that a resource ownership allocation configuration is valid. Other node systems cannot control a resource system not defined as owned by the resource system, and does not communicate requests direct to a resource system that is not defined as being owned by that node system.

Figure 6:
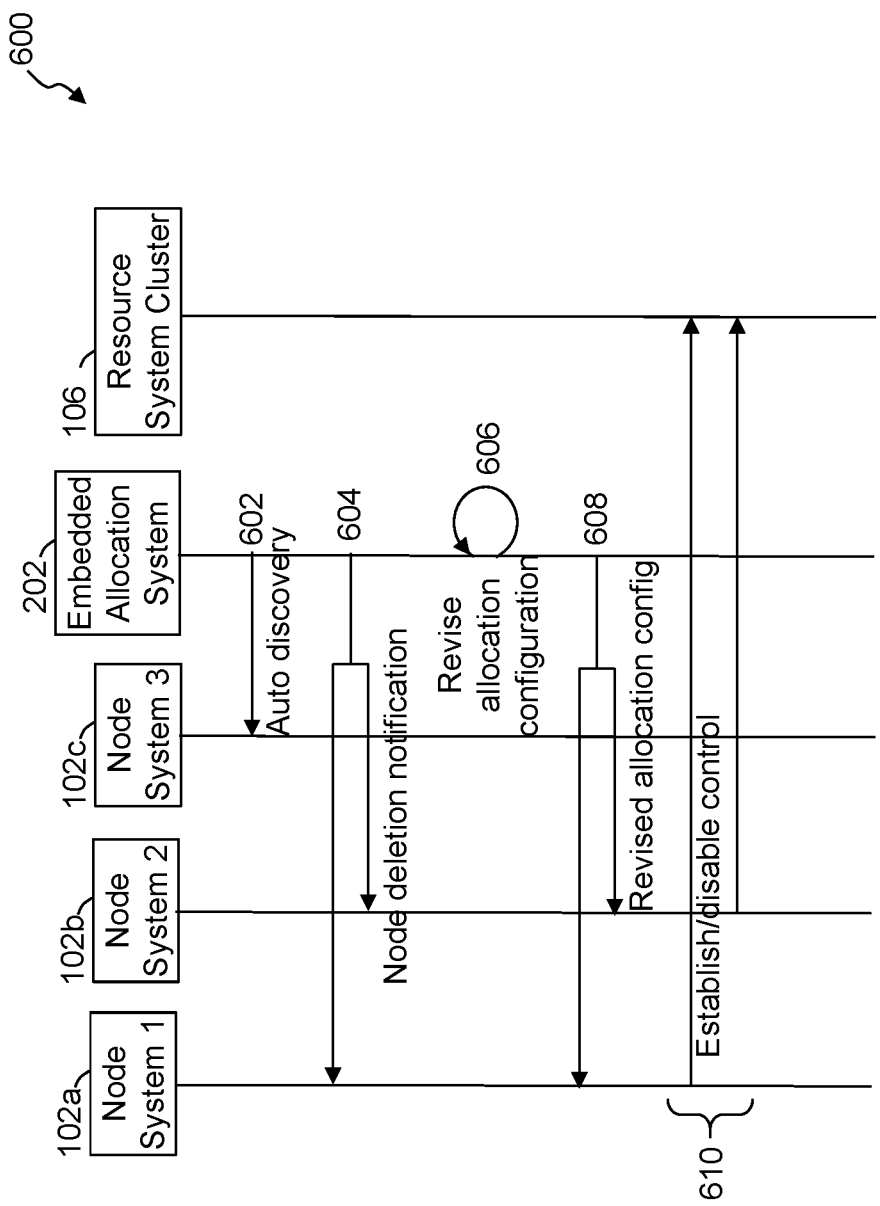
FIG. 6 shows a simplified functional diagram illustrating an exemplary process of compensating for a removal or loss of a node system from a cluster of a source load sharing system, in accordance with some embodiments.

FIG. 6 shows a simplified functional diagram illustrating an exemplary process 600 of compensating for a removal or loss of a node system 102c from the cluster 104 of the source load sharing system 100, in accordance with some embodiments. In some instances, a node system may fail, may lose communication connection, communication bandwidth may drop below a threshold, maintenance may be scheduled, and other such reasons why a node system may temporarily or permanently be removed or drop from the cluster. In step 602, the embedded allocation system 202 or one or more of the embedded allocation applications detects that a node system 102c is no longer functioning as part of the cluster and/or has otherwise been lost or removed from the system. This detection may be based on a notification from the node system 102 prior to the node system becoming disabled (e.g., powering down, maintenance, error detected, etc.), based on a failure to receive a period or other timed status communication, based on a lack of response to one or more inquiries, other such detection methods, or a combination of two or more of such methods.

In optional step 604, the remaining node systems of the cluster are notified of the loss of the node system 102c. In step 606, the embedded allocation system 202 identifies the available resource systems 106 and remaining available node systems, including identifying a subset of the resource systems comprising each of the resource systems owned by the lost node system 102c as dictated by the ownership allocation configuration. In some embodiments, a master embedded allocation application initiates the redefining of the resource ownership allocation configuration in response to detecting the loss of the node system. One or more routing and allocations rules are applied by the embedded allocation system in defining a revised resource ownership allocation configuration redefining the ownership of the multiple resource systems between the set of remaining node systems 102. This includes reallocating each of the subset of resource systems and defining a revised resource ownership allocation configuration that dictates ownership of each of the subset of resource systems to change ownership of each of the subset of the resource systems to be defined as exclusively owned by one of the remaining node systems of the cluster. As described above, the routing and allocation rules can consider one or more factors in defining the ownership, and the number of resources systems and number of node systems available. Further, in some embodiments, the rules consider resource request loads directed to different resource systems 106 and/or node systems 102, rate of resource requests, historic resource requests, capabilities of node systems, maintenance schedules, other such factors, and typically a combination of such factors.

In step 608, the revised resource ownership allocation configuration is distributed to each of the remaining node systems 102 (e.g., 102a, 102b) of the cluster. In step 610, each of the node systems establishes a communication connection with those resource systems 106 for which it has ownership, and disables control over those resource systems over which the node system previously had ownership and no longer has ownership over based on the revised resource ownership allocation configuration. In some embodiments, one or more of the embedded allocation applications of the node systems of the cluster (e.g., a master embedded allocation application) can notify a node registration system of the loss of the node system 103c, which can update a database or central registration system accessible to the node systems 102 of the cluster 104 that tracks the node system cooperation with the cluster, the ownership allocation configuration data, and/or other such information.

Figure 7:
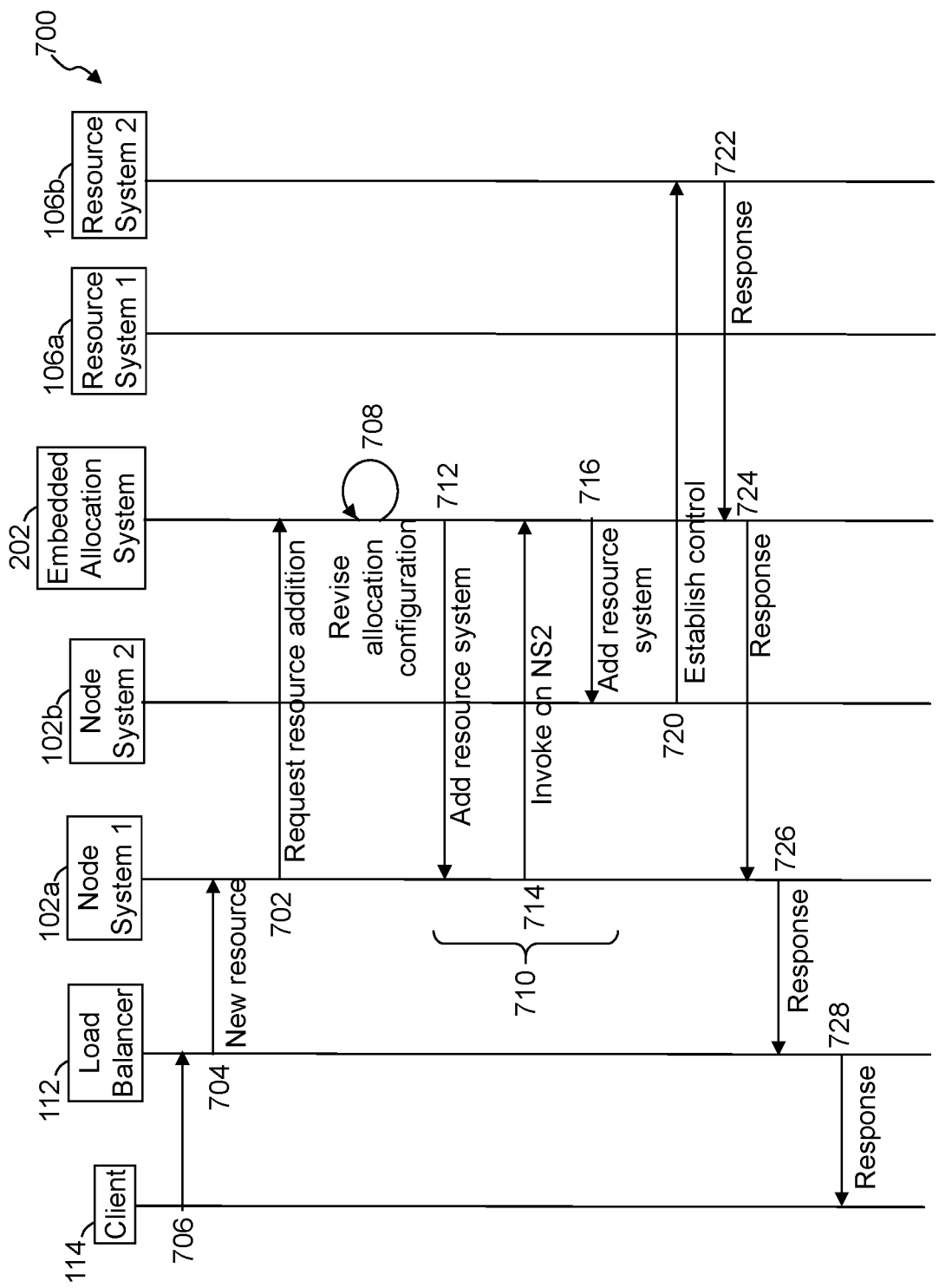
FIG. 7 shows a simplified functional diagram illustrating an exemplary process of adding a resource system to a cluster of a source load sharing system, in accordance with some embodiments.

FIG. 7 shows a simplified functional diagram illustrating an exemplary process 700 of adding a resource system 106b to the cluster 104 of the source load sharing system 100, in accordance with some embodiments. In step 702, the embedded allocation system 202 receives a notification and/or request to add a resource system 106b to the cluster. In some instances, the request to add the resource system may be in response to a notification 704 from the load balancer 112, which in some instances may be initiated 706 by a client system 114 instructing the addition of the resource system. In other implementations, the embedded allocation system may detect the availability of a new resource system, or other such notifications may be received.

In step 708, the embedded allocation system accesses the current resource ownership allocation configuration, identifies the available resource systems 106 and applies one or more routing and allocations rules in defining a revised resource ownership allocation configuration redefining the ownership of the multiple resource systems, including the new resource system 106b, between the set of node systems 102. The routing and allocation rules can consider one or more factors in defining the ownership, and the number of resources systems and number of node systems available. In some embodiments, the embedded allocation system 202 may communicate in step 712 with a master node system 102a and/or a node system that receives the request to add the resource system 106b to the cluster of resource systems. A confirmation to implement the allocation may be received in step 714 from the requesting node system. Some embodiments include optional step 716 that directs a request to the node system that is assigned to own the new resource system.

In step 720, the assigned node system 102b and/or a master node system 102a may establish a communication connect with the new resource system 106b. In step 722, the resource system can communicate a confirmation to the embedded allocation system 202 and/or the node system. Some embodiments include optional step 724 where the embedded allocation system sends a confirmation to the node system 102*a* requesting the new resource system 106*b* be added to the cluster. The confirmation may be forwarded in step 726 to the load balancer, which may in some instances send a confirmation in step 728 to the requesting client system 114. A process similar to the process 600 and/or 700 of reallocating resource systems may be implemented in response to one or more resource systems being lost and/or removed from the cluster.

Figure 8:
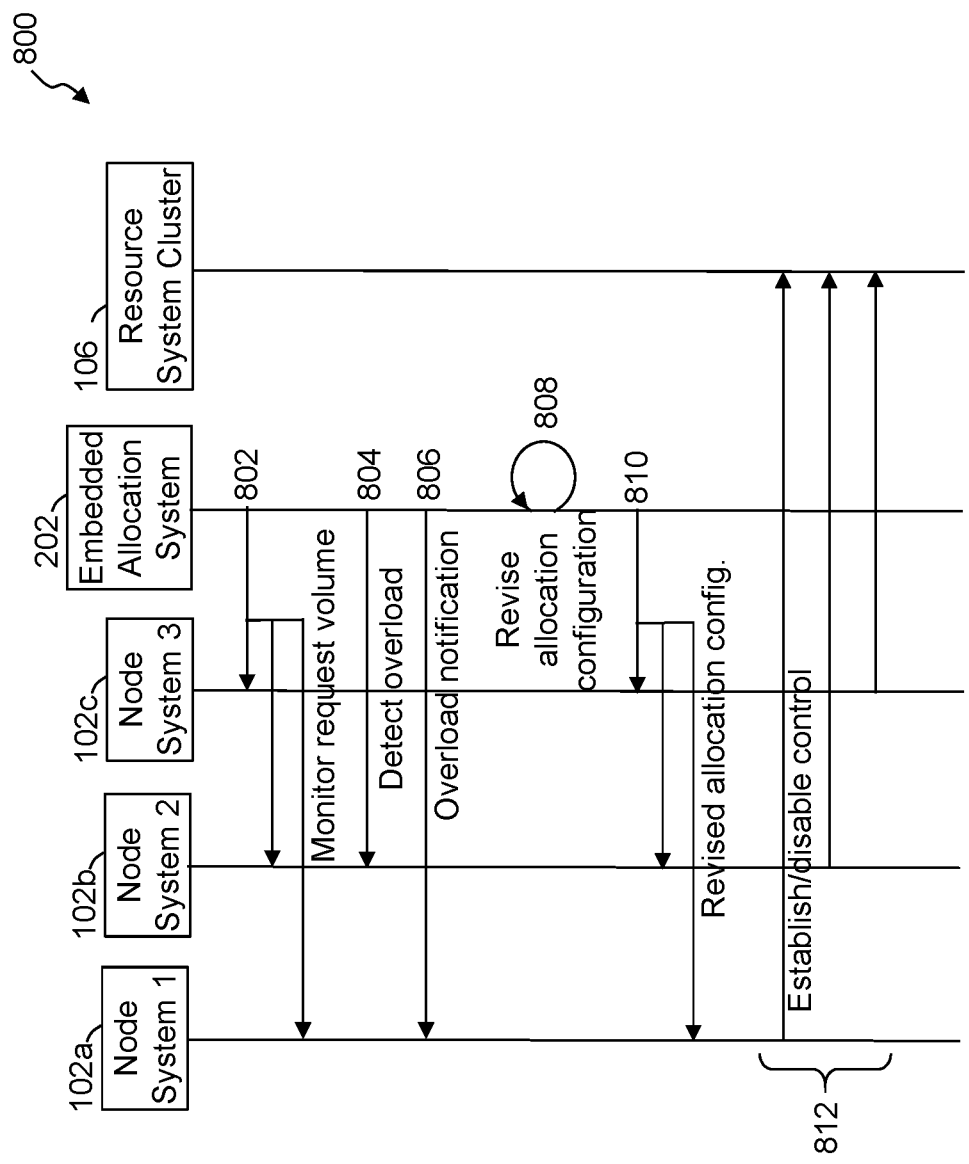
FIG. 8 shows a simplified functional diagram illustrating an exemplary process of compensating for an excess demand or overload on one or more node systems of a cluster, in accordance with some embodiments.

FIG. 8 shows a simplified functional diagram illustrating an exemplary process 800 of compensating for an excess demand or overload on one or more node systems 102 of the cluster 104, in accordance with some embodiments. In some instances, the load sharing system 100 can, as at least part of the self-organizing and high accessibility and reliability, can track the request loads on one or more of the node systems. When a request load of one node system exceeds a threshold and/or exceeds request loads of one or more other node systems by a threshold, the embedded allocation application may implement an adjustment to the ownership allocation configuration in attempts to easy a load burden on one or more node systems, improve reliability, improve performance and/or other such factors. In step 802, the embedded allocation systems 202 one or more node systems 102 can track the request loads of the node systems of one or more clusters 104.

In step 804, the embedded allocation application (e.g., the master embedded allocation application) may identify when a request load on a node system (e.g., a second node system 102*b*) exceeds one or more thresholds or criteria. The one or more thresholds may include a threshold number of pending resource requests to be completed, a rate threshold of resource requests directed to the node system, processing thresholds associated with implementing resource requests, time thresholds associated with implementing resource requests, duration of time that a request load is greater than a threshold quantity, other such thresholds, or combination of such thresholds. Some embodiments additionally or alternatively, the embedded allocation system may consider the resource request load on a second node system 102*b* relative to resource request loads on one or more other node systems 102*a*, 102*c*, and/or the relationships of the request loads relative to one or more thresholds on different node systems.

In step 806, the embedded allocation application may optionally notify one or more of the node systems (e.g., the master node system 102*a*) and/or embedded allocation applications on one or more node systems regarding the detected overload status. In step 808, the embedded allocation system 202 accesses the ownership allocation configuration and resource request information. Applying one or more rules the embedded allocation system defines a revised ownership allocation configuration that can reallocate resource systems between node systems in attempts to ease the request load on one or more node systems, attempt to balance request loads across two or more node systems, and/or other reallocation. Again, the reallocation may be based on historic rates of resource requests, current request loads, anticipated resource requests, and/or other such information. In some embodiments, a master embedded allocation application initiates the redefining of the resource ownership allocation configuration in response to detecting the overload condition. Further, in some embodiments, the rules may consider one or more of resource request loads directed to different resource systems 106 and/or node systems 102, rate of resource requests, historic resource requests, capabilities of node systems, maintenance schedules, other such factors, and typically a combination of such factors.

In step 810, the revised resource ownership allocation configuration is distributed to each of the remaining node systems 102 (e.g., 102*a*, 102*b*, 102) of the cluster. In step 812, each of the node systems establishes a communication connection and establishes control over those resource systems 106 for which it has ownership, and disables control over those resource systems over which the node system previously had ownership and no longer has ownership over based on the revised resource ownership allocation configuration.

In some implementations, the load sharing system 100 can include multiple different clusters 104 each having one or more node systems 102 and resource systems 106. In some embodiments, when a new node system 102 is attempting to join a cluster, the load sharing system may enable the automatic discovery of the multiple clusters and a selection of a cluster to join. The selection may be based on the resource system applications 206 operable on the new node system and/or that can be operated on the new node system, cluster size, request loads on node systems, and/or other such factors.

Figure 9:
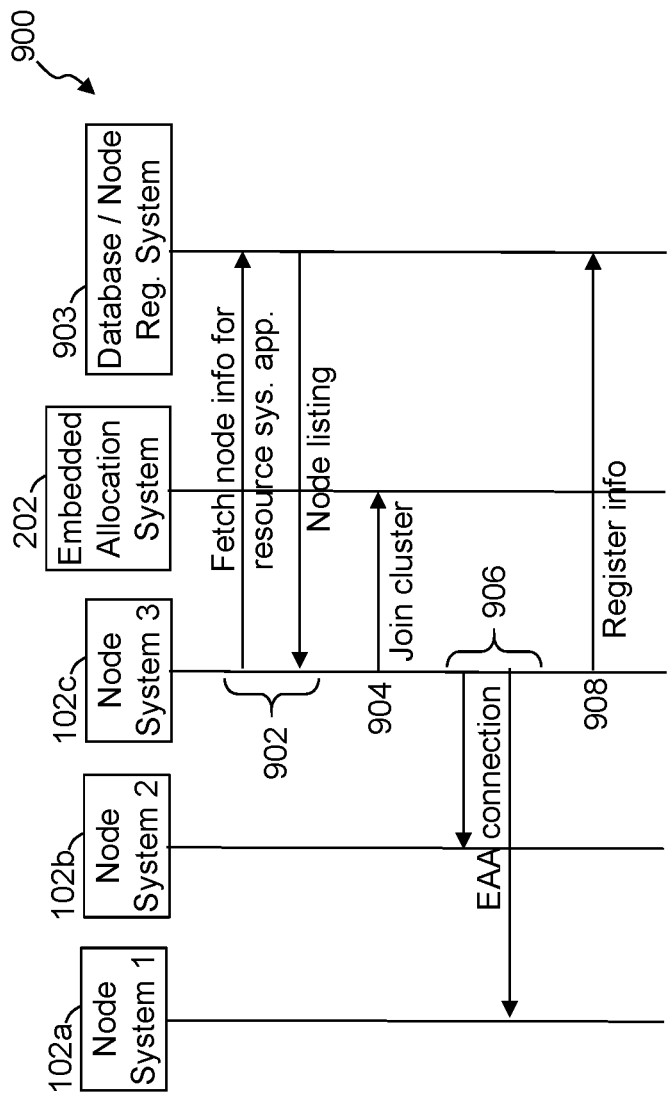
FIG. 9 shows a simplified functional diagram illustrating an exemplary process of an automated discovery and selection, by a new node system, of a cluster from multiple clusters of a source load sharing system, in accordance with some embodiments.

FIG. 9 shows a simplified functional diagram illustrating an exemplary process 900 of an automated discovery and selection, by a new node system 102*c*, of a cluster from multiple clusters 104 of a source load sharing system 100, in accordance with some embodiments. In step 902, a new node system 102*c* attempting to join one of multiple clusters accesses a cluster database 903 and/or node registration system to access node registration information for node systems of the different clusters and the resource system applications 206 implemented by the node systems of the different clusters. In some implementations, for example, node systems may be grouped according to resource system applications or business applications that can be implemented by those node systems to control the corresponding resource systems, and/or the tasks performed by the resource systems with which the node system can control. For example, node systems having one of a predefined number of one or more printer drivers may be directed to a first cluster, while node systems having memory access applications may be directed to a different cluster. In some embodiments, a relevant cluster may not have been established, and in such instances, a new cluster may be started with the new node system 102*c* becoming the first node system of the cluster.

In step 904, the embedded allocation application implemented on the new node system 102*c* communicates a notification of the availability of the node system to the selected cluster and/or requests to join the selected cluster. In step 906, the embedded allocation system of the new node system communicatively couples with each of the embedded allocation applications of the other node systems 102*a*, 102*b* of the selected cluster. In step 908, the embedded allocation application of the new node system registers with the database and/or node registration system 903 associating the new node system 102*c* with the selected cluster.

Figure 10:
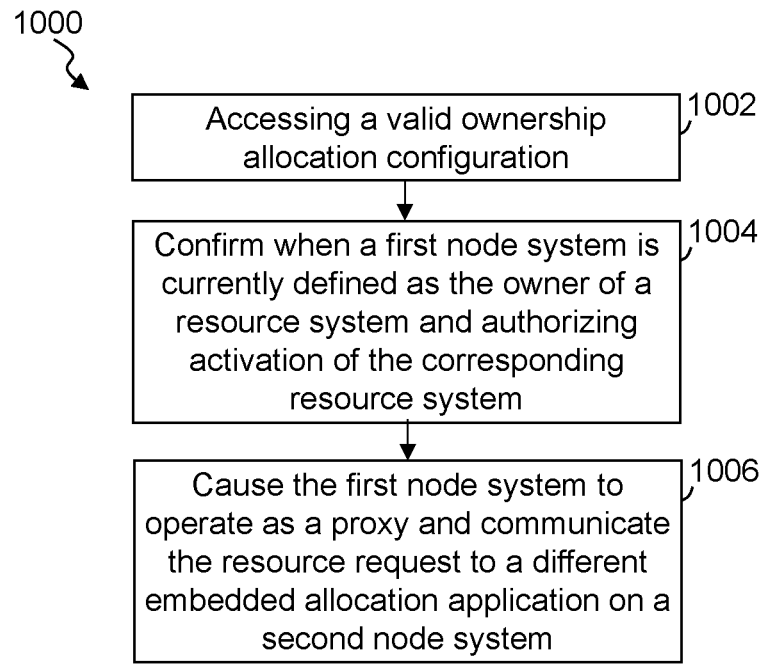
FIG. 10 shows a simplified flow diagram of an exemplary process of load sharing resource systems, in accordance with some embodiments.

FIG. 10 shows a simplified flow diagram of an exemplary process 1000 of load sharing multiple resource systems 106, in accordance with some embodiments. The process 1000 can be implemented in a retail environment, a banking environment, a hospitality environment, a financial services environment, and other such environments. In step 1002, each of a plurality of node systems 102 and/or the embedded allocation applications 116 implemented through respective node systems 102 of a cluster 104 access a valid ownership allocation configuration in response to receiving a resource request from a load balancer that distributes resource requests to the multiple node systems 102. The resource ownership allocation configuration is cooperatively defined by the multiple embedded allocation applications 116 and dictates exclusive ownership of each resource system 106, of the multiple resource systems, to one of the multiple node systems 102 such that an owner node system exclusively has access to implement a corresponding predefined task performed by the owned resource system while the ownership allocation configuration is valid across the multiple node systems.

In step 1004, a first node system is confirmed, based on the ownership allocation configuration, as currently defined as the owner of a first resource system and activation of the corresponding first resource system of the multiple resource systems is authorized when the resource request is intended for the first resource system. In step 1006, based on one or more of the routing and/or ownership allocation rules, the first node system is caused to operate as a proxy and communicate the resource request to a different embedded allocation application on a second node system that currently owns a second resource system in accordance with the ownership allocation configuration when the resource request is intended for the second resource system.

In some embodiments a first embedded allocation application of the plurality of embedded allocation applications, applies one or more routing and/or resource allocation rules of the set of resource allocation rules in response to receiving a notification communicated to the embedded allocation applications of the multiple node systems by an additional embedded allocation application on a node system initially attempting to join the cluster of the set of multiple node systems. In applying the one or more resource allocation rules the resource systems are reallocated a revised resource ownership allocation configuration is defined based on the reallocation that dictates ownership of each of the resource systems to change ownership of a plurality of the resource systems, which were defined to be owned by one or more of the set of node systems, to be defined as exclusively owned by the third node system. Further, some implementations cause the second node system to disable control over a third resource system based on the revised ownership allocation configuration. The third node system can be caused to communicatively establish control over the third resource system based on the revised ownership allocation configuration. In applying the one or more resource allocation rules some embodiments evaluate task loads of each of the multiple resource systems, and define the revised resource ownership allocation configuration based on the task loads of the multiple resource systems. For example, a master embedded allocation application may identify tasks pending to be performed by each resource system, back-logs of tasks to be performed by each resource system, historic rates of tasks assigned to each resource system, and/or other such task load parameters in determining the allocation of ownership of resource systems to node systems.

Some embodiments detect, by a first embedded allocation application of the plurality of embedded allocation applications, that the second node system is no longer functioning as part of the cluster. A subset of the resource systems comprising each of the resource systems owned by the second node system as dictated by the ownership allocation configuration can be identified. One or more resource allocation rules of the set of resource allocation rules can be applied, and at least each of the subset of resource systems can be reallocated to one or more of the remaining node systems of the cluster. Based on this reallocation, a revised resource ownership allocation configuration can be defined that dictates ownership of each of at least the subset of resource systems to change ownership of each of the subset of the resource systems to be defined as exclusively owned by one of the remaining node systems of the cluster. This revised resource ownership allocation configuration is distributed to the other embedded allocation applications that activate the corresponding node systems to establish ownership of the assigned resource systems. In some implementations, it can be identified when the embedded allocation application implemented on the node system, which is identified as no longer functioning as part of the cluster, was defined as a master embedded allocation application. Based on identifying that the lost embedded allocation application, some embodiments cause another embedded allocation application to take over as the master embedded allocation application.

The node systems and/or the embedded allocation applications may be configured to identify that a resource request, issued by the load balancer 112, is received by the corresponding node system when the resource request is directed to be implemented by the resource system. The resource ownership allocation configuration can be accessed and based on the resource ownership allocation configuration the node system and/or embedded allocation application can determine that the node system is currently defined as the owner of the resource system. A communication can be initiated from the node system to the first resource system to cause the activation of the first resource system to implement the second resource request. In some embodiments, a first node system may be configured to operate as the proxy, and identify that a resource request, issued by the load balancer, is received by the first node system and that the resource request is directed to be implemented by a second resource system. The resource ownership allocation configuration can be accessed. In some implementations, access is through an embedded allocation application, and based on the resource ownership allocation configuration, it can be determined that the second node system is currently defined as the owner of the second resource system. A communication can be initiated to a second embedded allocation application implemented through the second node system directing the second embedded allocation application to initiate performance of the third resource request.

Further, in some instances the node system 102 can identify that the resource request is received by the second node system 102 with the resource request directed to be implemented by the second resource system 106 defined as owned by the second node system. A communication can be initiated from the second node system to the second resource system to cause the activation of the second resource system to implement the resource request. In some instances, the second embedded allocation application can identify that a response is received from the second resource system in response to the resource request, and causes the response to be relayed to the first node system. The first node can be configured to communicate the relayed response to be directed to a requesting client system 114 that issued the resource request.

The source load sharing system 100 provides a self-organized routing and load sharing distributed system comprising a plurality of node systems 102 each implementing exclusive control over different resource systems 106 in accordance with a resource ownership allocation configuration, while the resource ownership allocation configuration is valid. Each resource system is configured to implement predefined tasks requested by remote client systems 114. Each resource system is associated exclusively with one node system at a given point in time as defined by the resource ownership allocation configuration. Further, each node system 102 can be defined to take ownership of multiple resource systems. The node systems each implement an embedded allocation application 116 that cooperatively define and modify the resource ownership allocation configuration over time. Through this internal routing and source load sharing system, high availability of the resource systems is provided without the need for external infrastructure or external systems to coordinate the resource systems. Further, the embedded allocation applications cooperative operate and communicate to add node systems to the source load sharing system 100 and provide reallocation of resources to the newly added node, which typically includes removing ownership of resource systems from one or more node systems and redefining ownership to the newly added node system. Similarly, the embedded allocation applications can detect the failure of a node system and/or a node system that is overloaded (e.g., based on resource requests exceeding one or more thresholds, such as a request quantity, a request data size, etc.). As such, the source load sharing system avoids a single point of failure in the system and solution.

In some implementations, a client system 114 communicates a resource request to a resource system, and a load balancer 112 may direct the resource request to any node system 102 in the cluster. The load balancer is not aware of the resource ownership allocation configuration, and instead may distribute resource requests based on a round-robin process, at random, and/or other processes that are not consistent with the resource ownership allocation configuration. The embedded allocation applications, however, cooperative operate to ensure the proper routing and the execution of the resource request by identifying the node system that is currently defined as the owner of the resource system to which the resource request is directed. When the intended resource system 106 is not owned by the node system 102 that received the resource request, the embedded allocation applications can coordinate with the owner node system to direct the resource request to that owner node system to allow the owner node system to implement the resource request. The routing and allocation rules are maintained and applied over time to define the resource ownership allocation configuration. For example, one or more embedded allocation applications can apply the rules for every new resource system added to the cluster 104, which can include identify a node system in the cluster that can take the ownership of the resource system, executes the resource system registration request and revised the resource ownership allocation configuration. In some embodiments, the embedded allocation applications can send notifications to each node system of the cluster in response to a node system addition, node system failures, node system overloads, and other such changes to the source load sharing system 100. Some embodiments further cause notifications to be communicated in response to resource system additions, resource system failures, resource system removals, and/or other such changes in conditions. Some embodiments define a master node and/or master embedded allocation application that generates and/or updates the resource ownership allocation configuration, and notifications can be sent to the nodes systems to take the ownership of the resources as determined by the resource ownership allocation configuration. In some implementations, the master node system and/or embedded allocation application 116 is elected by the system dynamically whenever a previous master node system goes down based on the notification sent to the node systems in the cluster.

In some embodiments, the embedded allocation applications manage resource distribution based on load sharing providing high availability in different system condition scenarios (e.g., node system go down, node system come back up after some time, new node systems are added, node systems are removed or fail, new resource systems are added, resource systems are removed, etc.) without additional external infrastructure. The source load sharing system 100 does not depend of replication or redundant storage for fault tolerance, does not use external systems to coordinate the cluster, does not depend on load sharing by hashing and incoming data keys while still being able to assign ownership of resource systems and reassign ownership of resource systems dynamically regardless of whether there is a node failure or node addition, and generally does not have a prerequisite minimum number of node systems (quorum) to implement the source load sharing system 100.

The source load sharing system 100 provides a self-organized routing and load sharing distributed system. The embedded allocation application is deployed in multiple node systems. The load balancer and clients do not need not know the allocation of resource systems or resource system ownership by the node systems. Client systems can send the resource request to the intended resource system, and in some embodiments the load balancer 112 can direct that resource request to any node system 102 in the cluster 104 (e.g., at random). Because the source load sharing system 100 is self-organized, the embedded allocation applications coordinate and define the ownership of resource systems through the resource ownership allocation configuration, which can include identify node systems that are can take ownership of the resource systems, including newly added resource systems. When a resource request is directed to a node system that does not own the resource system, that node system can identify the proper node system based on a distributed and cached current resource ownership allocation configuration, transfer the request to that node system, and when appropriate get a response and return it back to the client system 114.

In some embodiments, when there is a node failure the embedded allocation applications implemented on one or more other active node systems detect this failure, redefines the resource ownership allocation configuration to share the ownership of the resource systems that were owned by the failed node system. Similarly, the embedded allocation application can apply one or more rules to identify when a node system is overloaded, and modify ownership to share the load by taking ownership of one or more resource systems owned by the overloaded node and assign ownership to another node system. When a new node system is added to the cluster, the embedded allocation applications can distribute some of the resource systems from one or more other nodes and transferred ownership of those one or more resource systems to the new node system based on one or more allocation rules (e.g., loads, capabilities, number of resource systems, history resource requests, rates of resource requests to different resource systems, etc.).

In some embodiments, the embedded allocation applications shared data accessible to all embedded allocation applications. Further, node systems can be notified when one or more other node systems fail or are added. The embedded allocation applications cooperate to allow a node system to cause another node system to execute a resource request.

Some embodiments define a master node system and/or master embedded allocation application, which may apply the routing and allocation rules in cases of new resource system additions, resource reallocation when a node system fails, a new node system joins the cluster, and other such system conditions. In some instances, the allocation rules can be based on use case. For example, some allocation rules define equal assignment of resource systems to the node systems of the cluster, some allocation rules consider rates of resource requests, data sizes of resource requests, processing resources utilized to implement resource requests, and/or other such factors. A new master node and/or master embedded allocation application is defined automatically if when a previous master goes down (e.g., based on node system that has been in the cluster the longest, load on the node systems, etc.).

Below are simplified examples of node system and resource system reallocation based on different scenarios in accordance with some embodiments:

The embedded allocation application is configured with node system identifiers, which may be network addresses, IP addresses, a number and/or other such identifiers. For example a simplified node listing may include:

| Node1 | localhost: 5701 |
| Node2 | localhost: 5702 |
| Node3 | localhost: 5703 |
| Node4 | localhost: 5704 |

Similarly, resource systems can similarly be associated with an identifier utilized by at least the embedded allocation applications. As a simplified example, each resource system is identified with a different number (e.g., Device IDs: 1-15).

As described above, there are many different states of operation of the system and the allocation of resource systems between node systems. For example, in some instances the resource systems may be equally distributed across the multiple node systems (State #1—uniform distribution):

| Node# | Device IDs - |
|---|---|
| Node1 | 1, 2, 3, 4, 5 |
| Node2 | 6, 7, 8, 9, 10 |
| Node3 | 11, 12, 13, 14, 15 |

In other instances, the allocation of resource systems across node systems may be a non-uniform distribution (State #2—non-uniform distribution):

| Node# | Device IDs |
|---|---|
| Node1 | 1 |
| Node2 | 2, 3, 4, 5, 6 |
| Node3 | 7, 8, 9, 10, 11 |

Different events or scenarios may result in or trigger a reallocation and/or reassignment of resource systems between node systems. For example, when an additional resource system is added or comes back on line, the embedded allocation application may consider the current state of the allocation (e.g., whether the allocation is uniformly distributed (state #1), non-uniformly distributed (state #2), current and/or expected loads on different resource systems, and/or other such factors). In an exemplary scenario where an additional resource system is available the reallocation may be similar to:

| Scenario | Initial configuration | System Recommendation |
|---|---|---|
| Device Addition | State #1 | Node3 |
|  | State #2 | Node1 | where in state #1 the new resource system is added to node 3 as a next node system in a sequential order. In state #2, the embedded allocation application identifies the imbalance and assigns the resource to node 1.

In a scenario where a node system is lost, the reallocation of the resource systems may be based on one or more factors as described above. As a simplified example where node system 3 is lost:

| Scenario | Initial configuration | System Reassignment of devices | Remarks |
|---|---|---|---|
| Node3 is down | State #1 | Node1: 1, 2, 3, 4, 5, 11, 12, 15 | Devices assigned to Node1 from Node3: 11, 12, 15 |
|  |  | Node2: 6, 7, 8, 9, 10, 13, 14 | Devices assigned to Node2 from Node3: 13, 14 |
|  | State #2 | Node1: 1, 7, 8, 9, 10, 11 | Devices assigned to Node1 from Node3: 7, 8, 9, 10, 11 - - identifies devices without more capacity - - |
|  |  | Node2: 2, 3, 4, 5, 6 | No additional printers were added to Node2. |

In a scenario where a node system is added, the reallocation of the resource systems may be based on one or more factors as described above. As a simplified example where node system 4 is added:

| Scenario | Initial configuration | System Reassignment of devices | Remarks |
|---|---|---|---|
| Node4 is added | State #1 | Node1: 2, 3, 4, 5 | Devices removed from Node1: 1 |
|  |  | Node2: 7, 8, 9, 10 | Devices removed from Node2: 6 |
|  |  | Node3: 12, 13, 14, 15 | Devices removed from Node3: 11 |
|  |  | Node4: 1, 6, 11 | Devices added to Node4: 1, 6, 11 |

| Scenario | Initial configuration | System Reassignment of devices | Remarks |
|---|---|---|---|
| | State #2 | Node1: 1, 7 | Devices added to Node1: 7 |
| | | Node2: 4, 5, 6 | Devices removed from Node2: 2, 3 |
| | | Node3: 9, 10, 11 | Devices removed from Node3: 7, 8 |
| | | Node4: 2, 3, 8 | Devices added to Node4: 2, 3, 8 |

Some embodiments consider uniform weightage for each of the devices. For example, in some embodiments cost of connection, disconnection and load contribution are considered to be the same for all devices. In such scenarios, load refers to a number of resource systems that are connected to a node system. In some applications, the reassignment of resource systems happens between the node systems that have more capacity to accept additional load than node systems that are more loaded and/or overloaded. The resource system allocation can be extended to substantially any number of node systems and resource system, and with any relevant kind of resource allocation configuration. In some instances, for example, reassignment strategy is guided at least in part by what defines the load and the acceptable relative load between the node systems (e.g., an acceptable threshold load variation between node systems may be 15%, 20% or some other relevant threshold, which may depend on numbers of resource systems and node systems). The embedded allocation applications identify the load factor on the node systems and calculate the acceptable load factor range for each of the node systems. In some applications, load is defined as a number of resource systems, while in other applications the load is additionally or alternatively determined as a function of the number of requests processed through a particular node system, the type of requests handled, and other such factors. Based on the determined loads, some embodiments determine minimum and maximum number of permissible connections and disconnections of resource systems to bring the node systems within the threshold load variation and/or calculated load factor range and sorted based on the determined variations. Reassignment of resource systems can be applied, for example, with respect to the node system (node x) that can accept a maximum additional connections and one or more node systems (node y) that are to release maximum disconnection counts of resource systems. Once node x and/or node y has reached the desired threshold load variation, subsequent node system that can accept the next maximum node systems and the subsequent node system that is to disconnect from the next maximum are selected reassignment. In case of a node system down scenario, resources owned by that node system are assigned, in some embodiments, as priority to node systems in the order of connections they can accept.

Again, some embodiments apply the above described assignment and/or reallocation rules. Some of such rules may include: relative difference of loads between the node systems are maintained to less than a threshold variation (e.g., 20%), where such load numbers are maintained in the embedded allocation application; when load between node systems is greater than a threshold (e.g., 20%) reassignment or load sharing is implemented; other parameters to compute load that may be considered includes but is not limited to rate of requests received by a node system (e.g., compute average requests to a node system over 5 minutes and compare relative average loads of the different node systems); weightage may be assigned (e.g., by a user) to the resource systems based on predefined rules (e.g., user is aware that resource system x is not critical and resource system y is critical, the user can assign weights to the resource systems which can be used in load computation, such as assigning the more critical resource system to a node system with a lower number of assigned resource systems and/or lower number of average requests).

Figure 11:
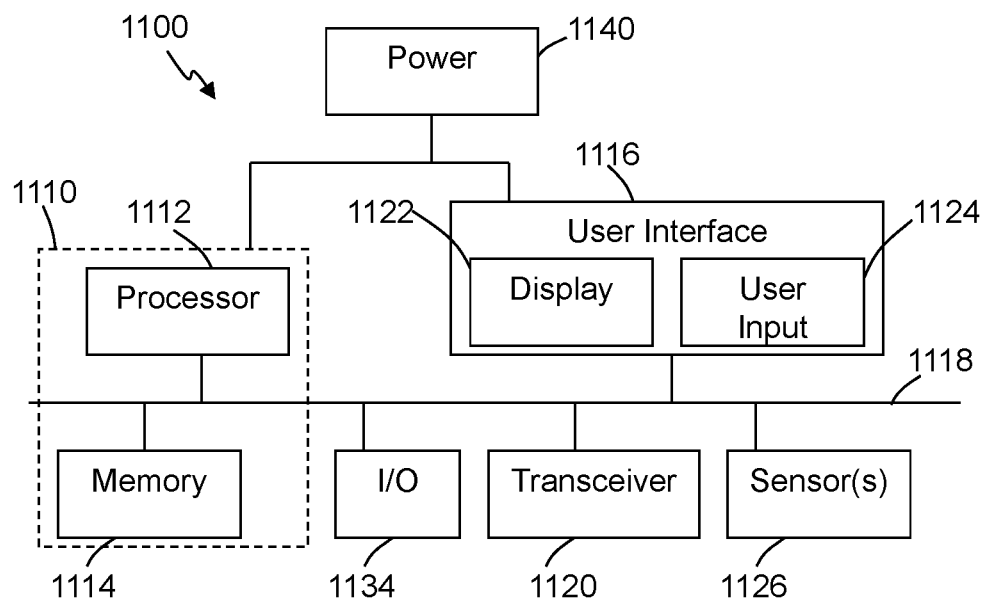
FIG. 11 illustrates an exemplary system for use in implementing methods, techniques, devices, apparatuses, systems, servers, sources and load sharing resource system, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 11 illustrates an exemplary system 1100 that may be used for implementing any of the components, circuits, circuitry, systems, functionality, apparatuses, processes, or devices of the source load sharing system 100, and/or other above or below mentioned systems or devices, or parts of such circuits, circuitry, functionality, systems, apparatuses, processes, or devices. For example, the system 1100 may be used to implement some or all of the node systems 102, resource systems 106, rules engine 108, the databases 118, and/or other such components, circuitry, functionality and/or devices. However, the use of the system 1100 or any portion thereof is certainly not required.

By way of example, the system 1100 may comprise a control circuit or processor module 1112, memory 1114, and one or more communication links, paths, buses or the like 1118. Some embodiments may include one or more user interfaces 1116, and/or one or more internal and/or external power sources or supplies 1140. The control circuit 1112 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, allocations, programs, content, listings, services, interfaces, logging, reporting, etc. Further, in some embodiments, the control circuit 1112 can be part of control circuitry and/or a control system 1110, which may be implemented through one or more processors with access to one or more memory 1114 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1100 may be used to implement one or more of the above or below, or parts of, components, circuits, systems, processes and the like. For example, the system may implement a node system 102 with the control circuit being a node system control circuit, a resource system 106 with the control circuit being a resource system control circuit, or other components.

The user interface 1116 can allow a user to interact with the system 1100 and receive information through the system. In some instances, the user interface 1116 includes a display 1122 and/or one or more user inputs 1124, such as buttons, touch screen, track ball, keyboard, mouse, etc., which can be part of or wired or wirelessly coupled with the system 1100. Typically, the system 1100 further includes one or more communication interfaces, ports, transceivers 1120 and the like allowing the system 1100 to communicate over a communication bus, a distributed computer and/or communication network 110 (e.g., a local area network (LAN), the Internet, wide area network (WAN), etc.), communication link 1118, other networks or communication channels with other devices and/or other such communications or combination of two or more of such communication methods. Further the transceiver 1120 can be configured for wired, wireless, optical, fiber optical cable, satellite, or other such communication configurations or combinations of two or more of such communications. Some embodiments include one or more input/output (I/O) ports 1134 that allow one or more devices to couple with the system 1100. The I/O ports can be substantially any relevant port or combinations of ports, such as but not limited to USB, Ethernet, or other such ports. The I/O interface 1134 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

The system 1100 comprises an example of a control and/or processor-based system with the control circuit 1112. Again, the control circuit 1112 can be implemented through one or more processors, controllers, central processing units, logic, software and the like. Further, in some implementations the control circuit 1112 may provide multiprocessor functionality.

The memory 1114, which can be accessed by the control circuit 1112, typically includes one or more processor readable and/or computer readable media accessed by at least the control circuit 1112, and can include volatile and/or non-volatile media, such as RAM, ROM, EEPROM, flash memory and/or other memory technology. Further, the memory 1114 is shown as internal to the control system 1110; however, the memory 1114 can be internal, external or a combination of internal and external memory. Similarly, some or all of the memory 1114 can be internal, external or a combination of internal and external memory of the control circuit 1112. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 110. The memory 1114 can store code, software, executables, scripts, data, content, lists, programming, programs, log or history data, user information, customer information, product information, and the like. While FIG. 11 illustrates the various components being coupled together via a bus, it is understood that the various components may actually be coupled to the control circuit and/or one or more other components directly.

In some embodiments, retail resource load sharing systems comprise: a cluster of a set of multiple node systems communicatively coupled with a separate load balancer and configured to receive resource requests from the load balancer distributing the resource requests across the multiple node systems; multiple different resource systems configured to each implement predefined tasks consistent with the resource requests, wherein each of the different resource systems is communicatively accessible over a communication network; wherein each of the multiple node systems comprises a node control circuit and an embedded allocation application configured to communicate with the other embedded allocation applications of the set of multiple node systems, wherein the multiple embedded allocation applications are configure to apply resource allocation rules from the first set of resource allocation rules to cooperatively define a resource ownership allocation configuration that dictates ownership of each of the resource systems exclusively to one of the multiple node systems such that an owner node system exclusively has access to implement the corresponding task performed by the resource system while the ownership allocation configuration is valid and accessible across the multiple node systems; and wherein each of the node system control circuits is further configured to: access the valid ownership allocation configuration in response to receiving a first resource request from the load balancer; confirm, based on the ownership allocation configuration, when a first node system is currently defined as the owner of a first resource system and authorizing activation of the corresponding first resource system of the multiple resource systems when the first resource request is intended for the first resource system; and cause the first node system to operate, based on an ownership allocation rule of the first set of resource allocation rules, as a proxy and communicate the first resource request to a different embedded allocation application on a second node system that currently owns a second resource system in accordance with the ownership allocation configuration when the first resource request is intended for the second resource system.

Some embodiments provide methods of load sharing retail resource systems, comprising: by each node systems of a cluster comprising a set of multiple node systems that are communicatively coupled with a separate load balancer and configured to receive resource requests from the load balancer distributing the resource requests across the multiple node systems: accessing a valid ownership allocation configuration in response to receiving a first resource request from the load balancer, wherein the resource ownership allocation configuration is cooperatively defined by the multiple embedded allocation applications and dictates exclusive ownership of each resource system, of multiple resource systems, to one of the multiple node systems such that an owner node system exclusively has access to implement a corresponding task performed by the owned resource system while the ownership allocation configuration is valid and accessible across the multiple node systems; confirming, based on the ownership allocation configuration, when a first node system is currently defined as the owner of a first resource system and authorizing activation of the corresponding first resource system of the multiple resource systems currently owned by the correspond first node system when the first resource request is intended for the first resource system; and causing the first node system to operate, based on an ownership allocation rule of the first set of resource allocation rules, as a proxy and communicate the first resource request to a different embedded allocation application on a second node system that currently owns a second resource system in accordance with the ownership allocation configuration when the first resource request is intended for the second resource system.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A retail resource load sharing system, comprising:
    a cluster of a set of multiple node systems communicatively coupled with a separate load balancer and configured to receive resource requests from the load balancer distributing the resource requests across the multiple node systems;
    multiple different resource systems configured to each implement at least one predefined task of multiple different predefined tasks consistent with the resource requests, wherein each of the different resource systems is communicatively accessible over a communication network;
    wherein each of the multiple node systems comprises a node control circuit and an embedded allocation application configured to communicate with the other embedded allocation applications of the set of multiple node systems, wherein the multiple embedded allocation applications are configured to apply resource allocation rules from the first set of resource allocation rules to cooperatively define a resource ownership allocation configuration that dictates ownership of each of the resource systems exclusively to one of the multiple node systems such that an owner node system exclusively has access to implement the corresponding task performed by the resource system while the ownership allocation configuration is valid and accessible across the multiple node systems;
    wherein each of the node system control circuits is further configured to:
        access the valid ownership allocation configuration in response to receiving a first resource request from the load balancer;
        confirm, based on the ownership allocation configuration, when a first node system is currently defined as the owner of a first resource system and authorizing activation of the corresponding first resource system of the multiple resource systems when the first resource request is intended for the first resource system;
        cause the first node system to operate, based on an ownership allocation rule of the first set of resource allocation rules, as a proxy and communicate the first resource request to a different embedded allocation application on a second node system that currently owns a second resource system in accordance with the ownership allocation configuration when the first resource request is intended for the second resource system; and
    wherein the embedded allocation applications cooperatively operate to implement a load sharing system and cooperatively operate to maintain and update a cache, maintained across the multiple node systems, storing ownership allocation configuration that is currently valid at each of the node systems.

2. The system of claim 1, wherein at least a first embedded allocation application is configured to apply one or more resource allocation rules of the first set of resource allocation rules, in response to receiving a notification communicated to the embedded allocation applications of the multiple node systems by a third embedded allocation application on a third node system initially joining the cluster of the set of multiple node systems, to reallocate the resource systems and define a revised resource ownership allocation configuration that dictates ownership of each of the resource systems to change ownership of a plurality of the resource systems, which were defined to be owned by one or more of the set of node systems, to be defined as exclusively owned by the third node system.

3. The system of claim 2, wherein the second node system is configured to disable control over a third resource system based on the revised ownership allocation configuration; and the third node system is configured to communicatively establish control over the third resource system based on the revised ownership allocation configuration.

4. The system of claim 2, wherein the first embedded allocation application in applying the resource allocation rules of the first set of resource allocation rules evaluates task loads of each of the multiple resource systems, and defines the revised resource ownership allocation configuration based on the task loads of the multiple resource systems.

5. The system of claim 1, wherein at least a first embedded allocation application is configured to detect the second node system is no longer functioning as part of the cluster, identify a subset of the resource systems comprising each of the resource systems owned by the second node system as dictated by the ownership allocation configuration, apply one or more resource allocation rules of the first set of resource allocation rules to reallocate each of the subset of resource systems and define a revised resource ownership allocation configuration that dictates ownership of each of the subset of resource systems to change ownership of each of the subset of the resource systems to be defined as exclusively owned by one of the remaining node systems of the cluster.

6. The system of claim 1, wherein at least a first embedded allocation application implemented on the first node system is configured to identify that a second embedded allocation application implemented on the second node system was defined as a master embedded allocation application, and takes over as the master embedded allocation application.

7. The system of claim 1, wherein the first node system of the cluster is configured to:
    identify that a second resource request, issued by the load balancer, is received by the first node system wherein the second resource request is directed to be implemented by a first resource system;
    access the resource ownership allocation configuration;
    determine based on the resource ownership allocation configuration that the first node system is currently defined as the owner of the first resource system; and
    initiate a communication from the first node system to the first resource system to cause the activation of the first resource system to implement the second resource request.

8. The system of claim 1, wherein a first node system in operating as the proxy is configured to:
    identify that a third resource request, issued by the load balancer, is received by the first node system wherein the third resource request is directed to be implemented by the second resource system;
    access, through a first embedded allocation application implemented on the first node system, the resource ownership allocation configuration;
    determine based on the resource ownership allocation configuration that the second node system is currently defined as the owner of the second resource system; and
    initiate a communication to a second embedded allocation application implemented through the second node system directing the second embedded allocation application to initiate performance of the third resource request.

9. The system of claim 8, wherein the second embedded allocation application on the second node system is configured to identify that a response is received from the second resource system in response to the third resource request, and to cause the response to be relayed to the first node system; and
wherein the first embedded allocation application is configured to cause the first node system to communicate the relayed response to be directed to a requesting client system that issued the third resource request.

10. The system of claim 1, wherein the embedded allocation applications are further configured to form socket connections between two or more node systems and enables data transfers between two or more of the embedded allocation applications utilized in defining the ownership allocation configuration.

11. The system of claim 10, wherein each node system of the set of multiple node systems comprises cache memory storing parameters and allocation data, and wherein the embedded allocation applications of the multiple node systems provide distributed cache capabilities that is accessible across and to each of the multiple node systems.

12. A method of load sharing retail resource systems, comprising:
by each of a plurality of node systems, each implementing a respective embedded allocation application, of a cluster comprising a set of multiple node systems that are communicatively coupled with a separate load balancer and configured to receive resource requests from the load balancer distributing the resource requests across the multiple node systems:
accessing a valid ownership allocation configuration in response to receiving a first resource request from the load balancer, wherein the resource ownership allocation configuration is cooperatively defined by the multiple embedded allocation applications and dictates exclusive ownership of each resource system, of multiple resource systems, to one of the multiple node systems such that an owner node system exclusively has access to implement a corresponding task performed by the owned resource system while the ownership allocation configuration is valid and accessible across the multiple node systems;
confirming, based on the ownership allocation configuration, when a first node system is currently defined as the owner of a first resource system and authorizing activation of the corresponding first resource system of the multiple resource systems currently owned by the correspond first node system when the first resource request is intended for the first resource system;
causing the first node system to operate, based on an ownership allocation rule of the first set of resource allocation rules, as a proxy and communicate the first resource request to a different embedded allocation application on a second node system that currently owns a second resource system in accordance with the ownership allocation configuration when the first resource request is intended for the second resource system; and
wherein the embedded allocation applications cooperatively operate to implement a load sharing system and cooperatively operate to maintain and update a cache, maintained across the multiple node systems, storing ownership allocation configuration that is currently valid at each of the node systems.

13. The method of claim 12, further comprising:
applying, by a first embedded allocation application of the plurality of embedded allocation applications, one or more resource allocation rules of the first set of resource allocation rules, in response to receiving a notification communicated to the embedded allocation applications of the multiple node systems by a third embedded allocation application on a third node system initially joining the cluster of the set of multiple node systems, to reallocate the resource systems; and
defining a revised resource ownership allocation configuration based on the reallocation that dictates ownership of each of the resource systems to change ownership of a plurality of the resource systems, which were defined to be owned by one or more of the set of node systems, to be defined as exclusively owned by the third node system.

14. The method of claim 13, further comprising:
causing the second node system to disable control over a third resource system based on the revised ownership allocation configuration; and
causing the third node system to communicatively establish control over the third resource system based on the revised ownership allocation configuration.

15. The method of claim 13, wherein the applying one or more resource allocation rules of the first set of resource allocation rules comprises evaluating task loads of each of the multiple resource systems; and
wherein the defining the revised resource ownership allocation configuration comprises defining the revised resource ownership allocation configuration based on the task loads of the multiple resource systems.

16. The method of claim 12, further comprising:
detecting, by a first embedded allocation application of the plurality of embedded allocation applications, that the second node system is no longer functioning as part of the cluster;
identifying a subset of the resource systems comprising each of the resource systems owned by the second node system as dictated by the ownership allocation configuration;
applying one or more resource allocation rules of the first set of resource allocation rules and reallocating each of the subset of resource systems; and
defining a revised resource ownership allocation configuration that dictates ownership of each of the subset of resource systems to change ownership of each of the subset of the resource systems to be defined as exclusively owned by one of the remaining node systems of the cluster.

17. The method of claim 12, further comprising:
identifying, by a first embedded allocation application on the first node system of the cluster, that a second resource request, issued by the load balancer, is received by the first node system wherein the second resource request is directed to be implemented by a first resource system;
accessing the resource ownership allocation configuration;
determining based on the resource ownership allocation configuration that the first node system is currently defined as the owner of the first resource system; and initiating a communication from the first node system to the first resource system to cause the activation of the first resource system to implement the second resource request.

18. The method of claim 12, wherein the first embedded allocation application in operating as the proxy is configured to:

identifying, by the first embedded allocation application of the plurality of embedded allocation applications, that a third resource request, issued by the load balancer, is received by the first node system wherein the third resource request is directed to be implemented by the second resource system;

accessing the resource ownership allocation configuration;

determining based on the resource ownership allocation configuration that the second node system is currently defined as the owner of the second resource system; and initiating a communication to a second embedded allocation application implemented through the second node system directing the second embedded allocation application to initiate performance of the third resource request.

19. The method of claim 18, further comprising:

identifying, by the second embedded allocation application, that a response is received from the second resource system in response to the third resource request, and causing the response to be relayed to the first node system; and causing the first node system to communicate the relayed response to be directed to a requesting client system that issued the third resource request.

* * * * *